(12) United States Patent
Yona et al.

(10) Patent No.: US 6,195,206 B1
(45) Date of Patent: Feb. 27, 2001

(54) OPTICAL SYSTEM FOR DAY AND NIGHT USE

(75) Inventors: Zvi Yona, Karkur; Sasson Abraham; Joseph Yaeli, both of Haifa, all of (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 09/228,418

(22) Filed: Jan. 12, 1999

(30) Foreign Application Priority Data

Jan. 13, 1998 (IL) .......................................... 122929
Oct. 22, 1998 (IL) .......................................... 126726

(51) Int. Cl.$^7$ ........................... G02B 27/14; G02B 27/12
(52) U.S. Cl. ............................................ 359/630; 359/639
(58) Field of Search ............................... 359/630, 633, 359/636, 638, 639; 345/7, 8, 9

(56) References Cited

U.S. PATENT DOCUMENTS

| | | | |
|---|---|---|---|
| 4,660,943 | 4/1987 | Ellis | 359/362 |
| 4,689,834 | 9/1987 | McCarthy et al. | 2/6.2 |
| 4,775,217 | 10/1988 | Ellis | 313/524 |
| 4,902,116 | 2/1990 | Ellis | 359/480 |
| 4,961,626 | 10/1990 | Fournier, Jr. et al. | |
| 5,035,474 | 7/1991 | Moss et al. | 359/13 |
| 5,091,719 | 2/1992 | Beamon, III | 348/8 |
| 5,113,177 | 5/1992 | Cohen | 345/8 |
| 5,184,231 | 2/1993 | Ellis | 359/13 |
| 5,243,450 | 9/1993 | Gerbe et al. | 359/13 |
| 5,266,930 | 11/1993 | Ichikawa et al. | 345/8 |
| 5,398,309 | * 3/1995 | Atkins et al. | 395/135 |
| 5,416,315 | 5/1995 | Filipovich | 250/214 VT |

FOREIGN PATENT DOCUMENTS

| | | |
|---|---|---|
| 0206324 A2 | 12/1986 | (EP) . |
| 0301473 B1 | 2/1989 | (EP) . |
| 0459580 B1 | 12/1991 | (EP) . |
| 0475790 A1 | 3/1992 | (EP) . |
| 0579506 A1 | 1/1994 | (EP) . |
| 0599759 A1 | 6/1994 | (EP) . |
| 0603027 A1 | 6/1994 | (EP) . |
| 0603092 A1 | 6/1994 | (EP) . |
| 0628261 A1 | 12/1994 | (EP) . |
| 0635742 A2 | 1/1995 | (EP) . |
| 0657111 A1 | 6/1995 | (EP) . |
| 0671646 | 9/1995 | (EP) . |
| 0284389 B1 | 9/1998 | (EP) . |
| WO 94/11773 | 5/1994 | (WO) . |
| WO 94/14349 | 7/1994 | (WO) . |

OTHER PUBLICATIONS

"An Overview of the Performance Envelope of Digital Micromirror Device (DMD) Based Projection Display Systems" Dr. Jeffrey B. Sampsell Digital Imaging Preprint from: Society for Information Display 1994 International Symposium,Seminar , Exhibition San Jose, California Jun. 12–17, 1994, pp. 1–4.

"DMD Display Systems: The Impact of an All–Digital Display ",Robert J. Gove Preprint form: Society for Information Display 1994 International Symposium,Seminar , Exhibition San Jose, California Jun. 12–17, 1994.

\* cited by examiner

Primary Examiner—Ricky Mack
(74) Attorney, Agent, or Firm—Pillsbury Madison & Sutro LLP

(57) ABSTRACT

A helmet mounted display for mounting on a helmet includes a supporting structure removably mounted at at least one point to the helmet, a visor, mounted on the structure, and at least one optical system, for projecting an image on the visor from the side of the pilot's head. The at least one optical system is side mounted on the supporting structure, and includes a source of light and a digital reflective device or a reflective addressing device. The digital reflective device contains a plurality of micromirrors for deflecting the light source in a pixelated manner via a plurality of pixels. The deflection of the micromirror can be controlled as a function of time.

26 Claims, 24 Drawing Sheets

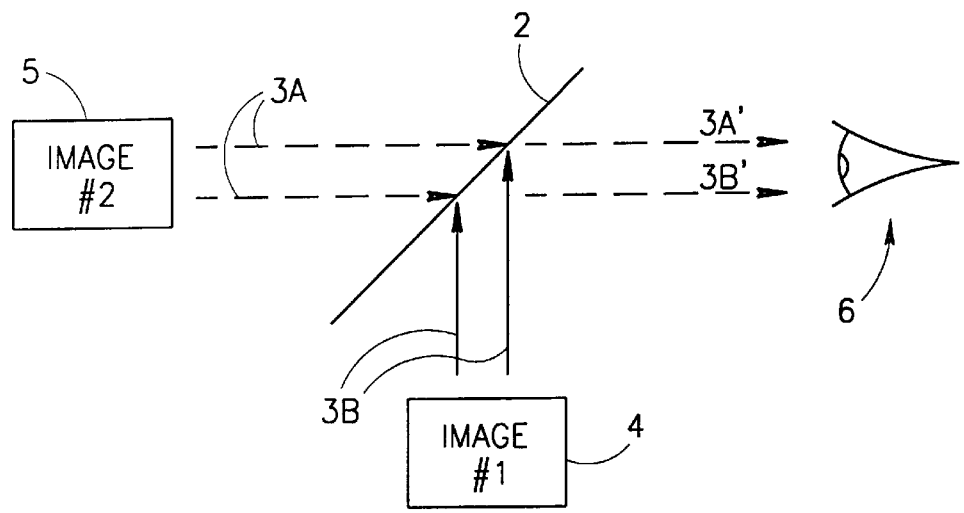
FIG.1A
PRIOR ART
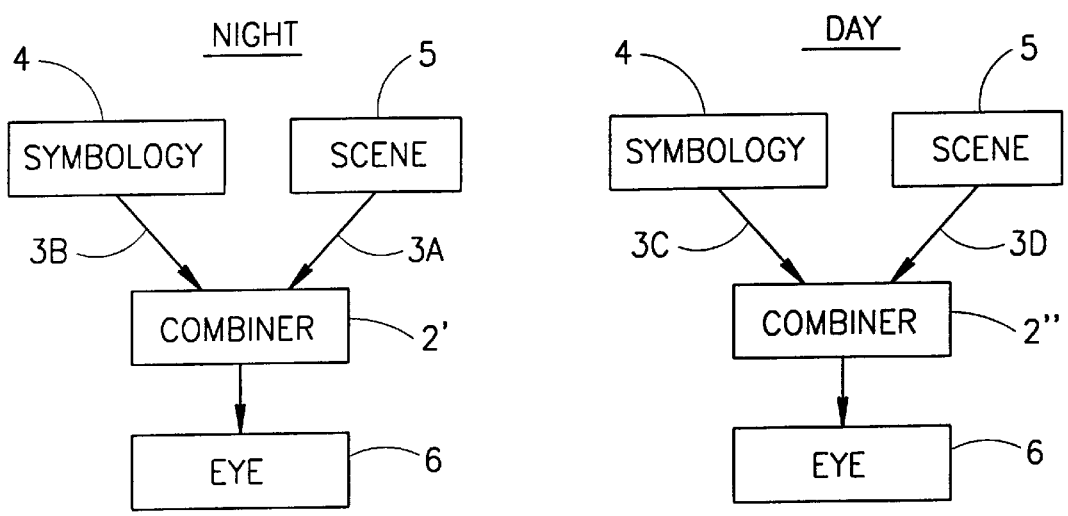
FIG.1B
PRIOR ART
FIG.1C
PRIOR ART

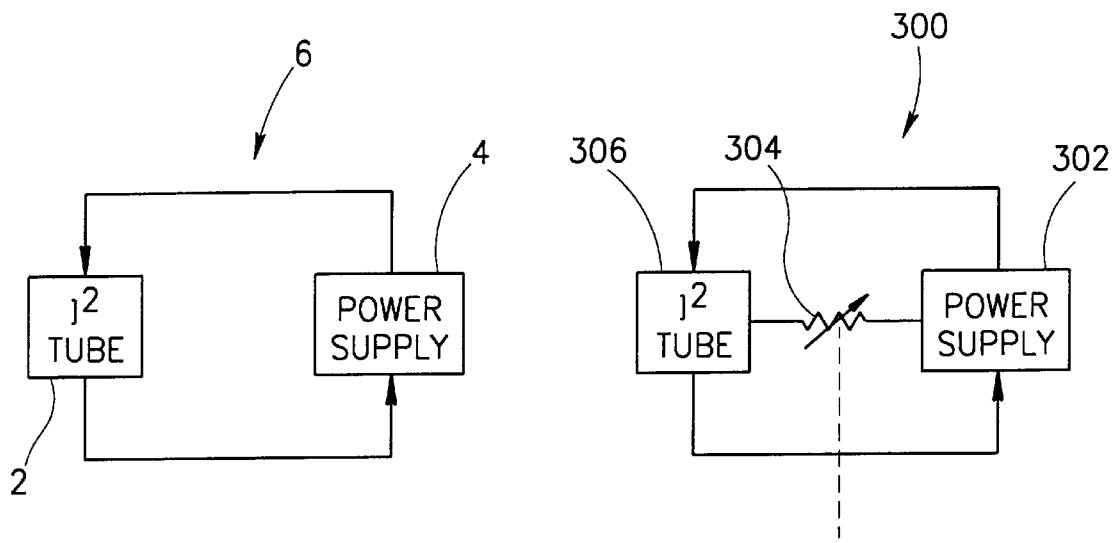
FIG.14A
PRIOR ART
FIG.14B
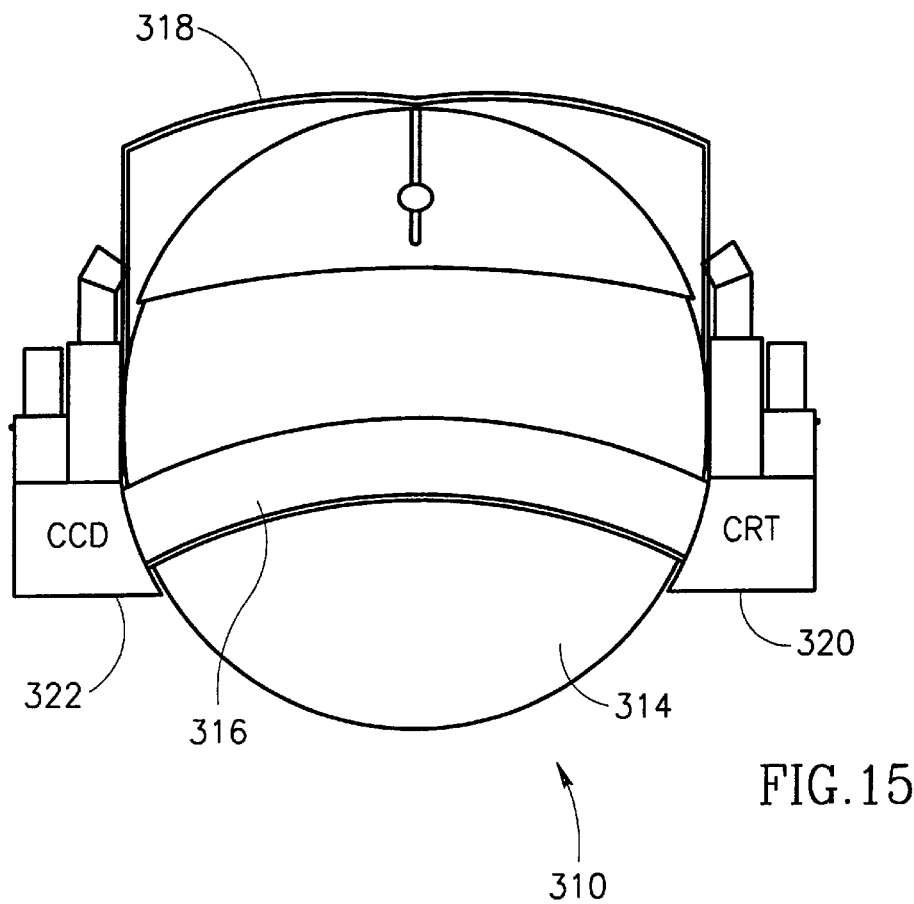
FIG.15

OPTICAL SYSTEM FOR DAY AND NIGHT USE

FIELD OF THE INVENTION

The present invention relates to image generation displays generally and more particularly to optical time domain capping/combining as utilized for image generation generally and more particularly in head mounted displays for day and night.

BACKGROUND OF THE INVENTION

Head mounted display systems including an assembly enabling night vision are well known in the art. The prior art as represented in the U.S. Patents, European Patents, European and PCT Patent Applications literature include U.S. Pat. Nos. 4,961,626 to Fournier et al, 5,416,315 to Filipovich, 4,660,943 to Ellis, 4,689,834 to McCarthy et al, 4,775,217 to Ellis, 4,902,116 to Ellis, 5,035,474 to Moss et al, 5,091,719 to Beamon, 5,113,177 to Cohen, 5,184,231 to Ellis, 5,243,450 to Gerbe et al, 5,266,930 to Ichikawa et al, EP Patent no's and PCT 0,284,389 B1 to Evans et al, 0,301,473 B1 to Rotier, and EP Patent Applications, 0,206, 324 A2 to Harrison et al, 0,628,261 A1 to Jolly et al, WO 94/14349 to Badou et al, 0,603,027 A1 to Badou et al, 0,603,092 A1 to Perbet et al, 0,599,759 A1 to Lach et al, WO 94/11773 to Fritz et al, 0,579,506 A1 to Bryare, 0,475,790 A1 to Monnier et al, 0,459,580 B1 to Migozzi et al, 0,671,646 A1 to Capdepuy et al, 0,657,111 A1 to Lefort et al, 0,635,742 A1 to Francois et al.

Generally speaking, prior art head mounted displays (HMD), in particular, those providing night/day vision capability are deficient in many respects. Among others, prior art head mounted displays are deficient with respect to: the location of the optical assembly providing night/day vision capability, the types of information available to the viewer, the recording capabilities of the flight and the quality and adaptability of the display for optimum display performance in varying conditions of light intensity. In general, the combination of separate images, not necessarily in a HMD context, is a cumbersome task requiring electronics and signal processing.

A particular problem with prior art head mounted displays is encountered in the case where illuminated symbols are superimposed onto a background of a scene image. The scene image may be viewed directly, as in a daytime image, and in such images, no processing is required to render it acceptable to view.

The scene may also be generated by an indirect image source to enhance the scene image. Generally, indirect imaging is used at night as the image may be poor due to the darkness. An image intensifier ($I^2$) coupled with a charge coupled device (CCD) camera (ICCD) or forward looking infra-red (FLIR) may be utilized for this purpose. When a night scene is viewed, it is typically viewed with a direct optical coupling system from an image intensifier mounted onto a helmet.

In order to combine the direct day viewing image with the indirect intensified night or symbology scene image, an optical combiner is generally used. An optical combiner is an optical device which enables one to see a single superimposed image from the images of two different objects. An example of such a device is a partially silvered mirror allowing rays from behind it to pass through, whilst reflecting rays incident on it into the same path as the rays arriving from behind.

For purposes of the explanation herein, all references to a direct scene image or direct object refer to an image transmitted without any image processing, and all references to an indirect image refer to an image which has been formed with some type of image processing, such as through an image intensifier, a camera/display, etc.

Reference is now made to FIG. 1A, a basic schematic of a prior art optical combiner 2. Optical combiner 2 receives rays from an image 4 and an image 5. The rays from image 4 are reflected off of the combiner 2, as represented by arrow 3B, and received by an eye 6. The rays from image 5 are transmitted through combiner 2, as represented by arrow 3A, and also received by the eye 6.

Thus eye 6 receives one superimposed image created from the rays 3A from image 5 and from the rays 3B from image 4. The optical equation for the received superimposed image is:

rays 3A'+rays 3B'=superimposed image;

Rays 3A' and rays 3B' are defined as:

rays 3A'=(rays 3A)(T%), where T=% transmission of rays 3A; and rays 3B'=(rays 3B)(R%), where R=% reflection of rays 3B;

The resultant equation after substitutions for 3A' and 3B' is:

(rays 3A)(T%)+(rays 3B)(R%)=superimposed image, where the superimposed image $\leq$ 100%

Therefore the ratio of mix of rays 3A' and rays 3B' need to be determined in advance. For a prior art optical system however, the resultant image is always less than or equal to 100%, or the sum of the received relative rays 3A and 3B.

The disadvantage of this approach is that the conflicting requirements for image combination during the day and night cannot be catered to in one unit. FIGS. 1B–C which are now referred to are schematic illustrations of the typical day and night biases of the standard prior art combiner system.

FIG. 1B illustrates an example of nighttime transmission of symbology 4 and scene image 5 transmitting two rays 3A–B, through a combiner 2' to an eye 6. FIG. 1C illustrates an example of daytime transmission of symbology 4 and scene 5 transmitting two rays, represented by arrows 3C–D, through a combiner 2" to an eye 6.

As shown in FIG. 1B, during night-use the strength of ray 3A from the scene 5 is required to be greatest due to the poor image produced by the darkness. Conversely, the darkness creates enough contrast for a minimum strength ray 3B from the symbology 4. The two rays 3A and 3B are then combined through combiner 2' with a resultant image received by eye 6 of superimposed symbols 4 on the scene 5.

Conversely, as shown in FIG. 1C, during day-use the strength of ray 3C transmitted from symbology 4 is required to be greater than the strength of ray 3D from the scene 5. This is in order to enhance final superimposed intensity of symbology 4 which may appear faded against a bright day scene 5.

Thus, depending on the external brightness or darkness, the strength of one of the rays 3 from either symbology 4 or from scene 5 is transmitted more, and the other transmission ray 3 is transmitted less. It is noted however, that in all instances for both brightness and darkness, both of the rays are received by combiner in a related proportion of the final image are equal to less than 100% of the final image. Therefore the sum of two rays, as per the equation noted above, is as follows:

T% (transmission ray 3A)+T% (transmission ray 3B) $\leq$ 100% or

T% (transmission ray 3C)+T% (transmission ray 3D) $\leq$ 100% when $T_{3A} > T_{3C}$ and $T_{3B} < T_{3D}$.

There is no simple way to change the transmission/ reflection ratio of the optical combiner between day and night in order to accommodate these two differing requirements. Currently, the only viable solution is to alternate between combiner 2' and 2", for either night or day use respectively, whichever is appropriate. However, this solution generally involves changing the whole optical element of the HMD for optimum performance in each situation, hence the requirement for day HMD and night HMD.

Currently, when two different image sources which are looking at a same scene are combined, a single electronic signal processing means is employed. Generally one of the image sources is a Charge Coupled Device (CCD) converting image intensifier ($I^2$) image, and the other image source is a camera converting a direct scene or FLIR. The two image sources are sampled to two separate digital mediums, and the two resultant images are combined pixel by pixel to one digital image using signal processing. The combined digital image is then displayed on a visible image medium (display).

In the particular case of a HMD, such a system may be used either as an integral part of the HMD or as a separate unit. FIG. 2, which is now referred to herein shows a prior art digital sampling and signal processing unit 70 for combining two images in a HMD display. This system is equally applicable to a non-HMD application where two image sources are to be combined. As an example of a HMD combination application, a generated night image is described hereinbelow.

Prior art system 70 consists of an image sensor unit 72, an electronic memory, a memory/signal-processing unit 74 and a display unit 76. Sensor unit 72 contains two or more separate image sources, which may be physically apart.

A first image source 78A may consist of an $I^2$ generated image and a second image source 78B may consist of a Forward Looking Infra Red (FLIR) image, any other desirable combination, or image sources. The $I^2$ source 78A is converted to a video signal by a CCD, ICCD, or a camera 80A, and the FLIR source 78B is converted to a video signal by an image converter 80B.

Both "video" signals are respectively sampled and converted to a digital signal by sampler/analog-digital units 82A and 82B respectively. The digital signals are then stored in respective memories 84A and 84B. A signal processor 86 in conjunction with an image processor/timer 88 processes each designated corresponding pixel from memory 84A and 84B and combines them into a single memory 90. The information in memory 90 is converted by a display interface/digital-analog converter 92 and transferred to display unit 76 for display.

A display electronics 94, a display media or source 96 and an eye optics relay 98 display a combined picture for an observer from the data stored in memory 90. An analog image is generated if the display source 96 is a Cathode Ray Tube (CRT). A digital image is generated if the display source 96 is an Active Matrix-Liquid Color Display (AM-LCD), Active Matrix-Electro Luminect (AM-EL), Plasma Display Panel (PDP), flat panel display (FPD) or any other display media.

Unfortunately, the processing unit 74 is cumbersome and some of its elements must be installed off-helmet.

SUMMARY OF THE INVENTION

The present invention provides an improved head mounted display which provides night and day vision capability.

The present invention further provides a method for combining two images using time sharing, allowing continuous intensity variation for each of two superimposed images to optimize image quality in the light of prevailing external conditions useful in general and for HMD viewers.

According to one aspect of the present invention, the head mounted display is mounted such that the optical assembly providing night vision capabilities is located generally in the same height of the pilot's eyes, whereby elevation estimations made by the pilot are improved.

According to another aspect of the present invention, the head mounted display provides simultaneously direct image amplified night image and synthetic image, whereby the pilot receives information of the scenery from three different sources.

According to yet another aspect of the present invention, the head mounted display includes a recording channel for recording the scenery viewed by the pilot throughout the flight.

According to another aspect of the present invention, the head mounted display of the present invention includes modular assemblies which together are replaceable and changeable.

According to a further aspect of the present invention, the head mounted display of the present invention contains a combiner which provides colored and monochrome symbology giving high contrast over the scenery.

According to yet a further aspect of the present invention, the head mounted display of the present invention contains a combiner or visor which provides a colored and monochrome symbology over an indirect sensor image.

According to yet another aspect of the present invention there is provided a sensor generated image fusion capability of images from two indirect sensors or two ordinary images or a combination of direct and indirect images in a helmet mounted display.

According to a further aspect of the present invention there is provided a general fusion capability of two images in an optical system.

In accordance with the present invention, there is thus provided a helmet mounted display for mounting on a helmet which includes a supporting arc removably mounted at least at one point to the helmet, a visor, mounted on the arc and at least one optical system, side mounted on the supporting arc, for projecting an image on the visor from the side of the pilot's head. The structure of the helmet has a personally fitted interface for mounting the display module on it.

The visor includes two side arms for connecting to the supporting arc and a mirror, generally shaped in the form of glasses.

According to one aspect of the invention, the mirror is semi-transparent, so as to enable visible light from the external scene to pass therethrough as well as to reflect the image. Alternatively, the mirror can be non-transparent.

The optical systems which can be used, according to the invention are selected from the group consisting of: a light night intensifying unit and an optical projecting unit.

The display image unit is selected from the group consisting of: a cathode ray tube (CRT), a liquid crystal display (LCD), a deformable mirror device and a digital mirror device.

The helmet mounted display, according to the invention, may further include a power interface for connecting to an external power supply unit.

Accordingly, the helmet mounted display may further include a portable power supply unit, which is connected to the power interface.

The visor may be connected to the supporting arc via a hinge which enables tilting of the visor up or down. An optical system which is mounted on the helmet mounted display may be connected to the supporting arc via the hinge or be firmly connected thereto.

According to another aspect of the invention there is thus provided a head mounted display for mounting on the helmet which includes means enabling direct vision of scenery, means enabling intensified vision of at least part of the scenery and means for providing a synthetic image superimposed on the image by the direct vision and the image provided by the intensified vision. According to this aspect, three images are displayed to a pilot wearing the helmet, with the mounted display.

Furthermore there is provided a head mounted display for mounting on a helmet which includes a recording system for recording an image generally simultaneously projected onto a visor of the head mounted display and means for intensifying an image of a scenery to be viewed.

In accordance with the present invention, there is thus provided a helmet mounted system for displaying high contrast images. Accordingly, a source of light, which is preferably a switch red, green and blue array for producing color images, is transmitted off a digital reflective device. Alternatively, the source of light is a switched colored array which produces monochromatic images.

The digital reflective device contains a plurality of micro-mirrors for deflecting the source of light in a pixelated manner via a plurality of pixels. Each pixel corresponds to a deflection of each micromirror on the digital reflective device and the intensity of each pixel is proportional to the duration of the deflection. The duration of defection is adjustable per pixel and is a function of time.

Preferably the digital reflective device is either a digital micromirror display or a reflective active matrix-liquid crystal display. And the deflection or positioning of the digital reflective device is controlled by an image processor and timing circuit or any type of digital driving circuit.

There is additionally provided a system for displaying high contrast images over a scene. The system receives a source of light and at least one optical image produced by a display optical system, and superposes said source of light over said optical image. The system switches between the source of light and the optical image as a function of time.

The superposition intensity of each image is continuously varied in a pixelated manner. The display optical system is either a reflective device which generates images, or a emissive device which generates images.

Furthermore there is provided a system for displaying two or more images. The at least first image is produce by at least one first image source and the at least one second image is produced by a at least one second image source. The images preferably can be sensed and/or displayed by any desired pixel by pixel ratio.

In accordance with the present invention, there is thus provided a method for combining two images, the steps include creating a first image, creating a second image, and switching between the first image and the second image. The method creates a viewable combined single image, such that the switching is timed on a pixel by pixel basis to vary the intensity of each of said first and said second image on a pixel by pixel basis.

BRIEF DESCRIPTION OF THE DRAWINGS

The present invention will be understood and appreciated more fully from the following detailed description taken in conjunction with the appended drawings in which:

FIG. 1A is a schematic illustration of a prior art optical combiner;

FIGS. 1B–1C are schematic illustrations of the conflicting requirements for transmission in a prior art optical combiner used to combine a direct scene and an indirect source in a helmet mounted display;

FIG. 14A is a schematic illustration of circuit for controlling the operation a prior art power circuit for providing power to a night light intensifier;

FIG. 14B is a schematic illustration of a power circuit for providing variable intensity control over a night light intensifier;

DETAILED DESCRIPTION OF THE PRESENT INVENTION

Figure 3:
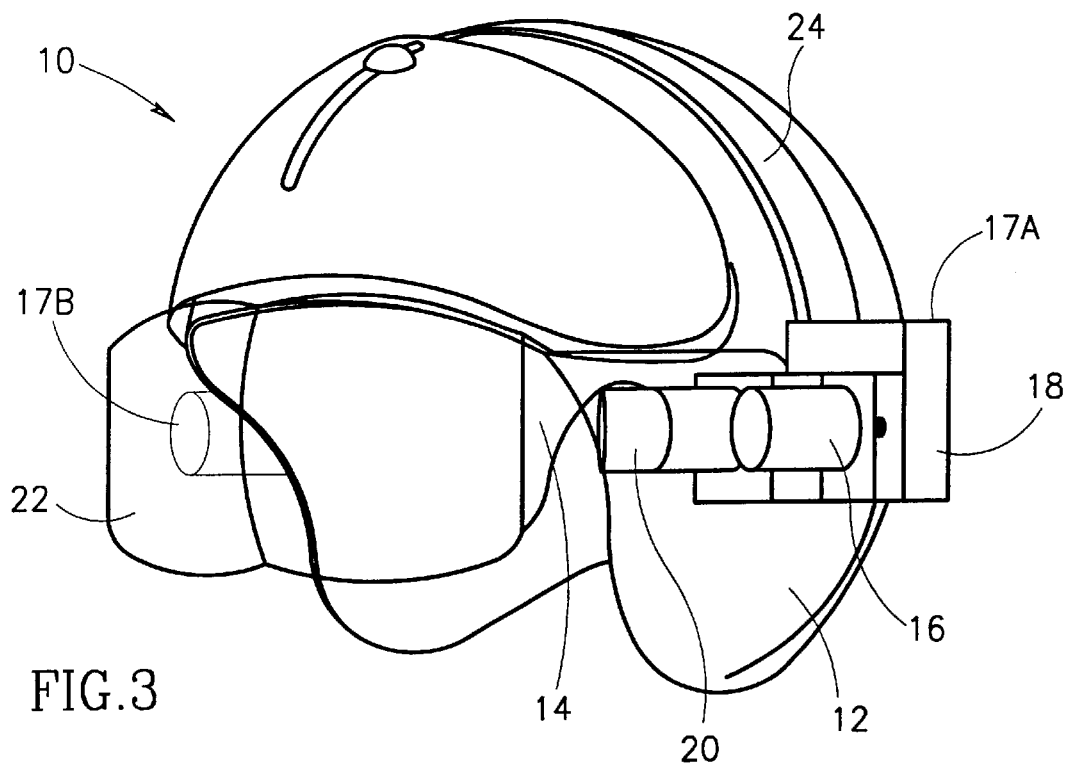
FIG. 3 is a schematic isometrix illustration of a helmet, with a head mounted display, constructed and operative in accordance with a preferred embodiment of the present invention.
Figure 4A:
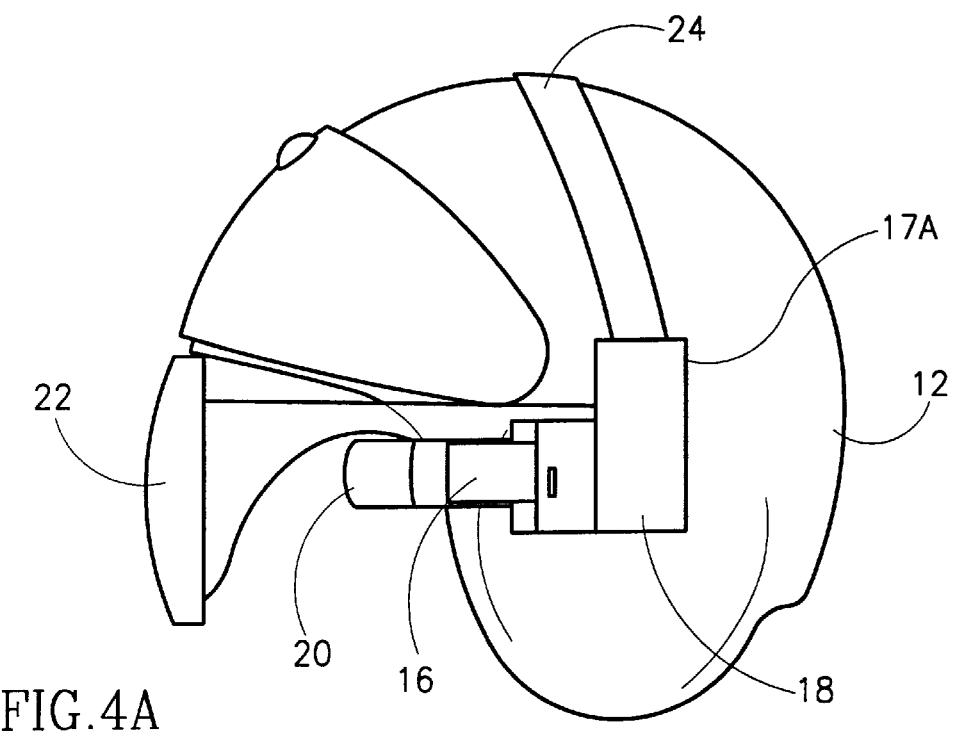
FIG. 4A is a schematic side view of the helmet and the head mounted display of FIG. 3.
Figure 4B:
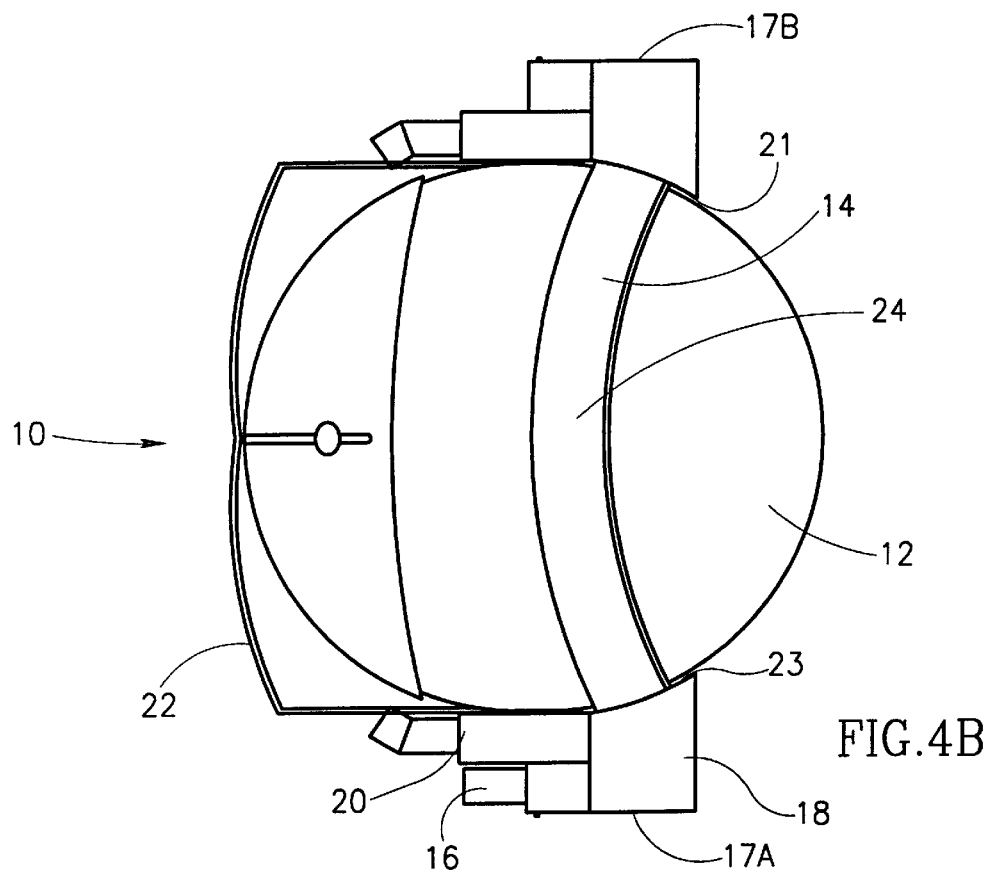
FIG. 4B is a schematic top view of the helmet and the head mounted display of FIG. 3.
Figure 5:
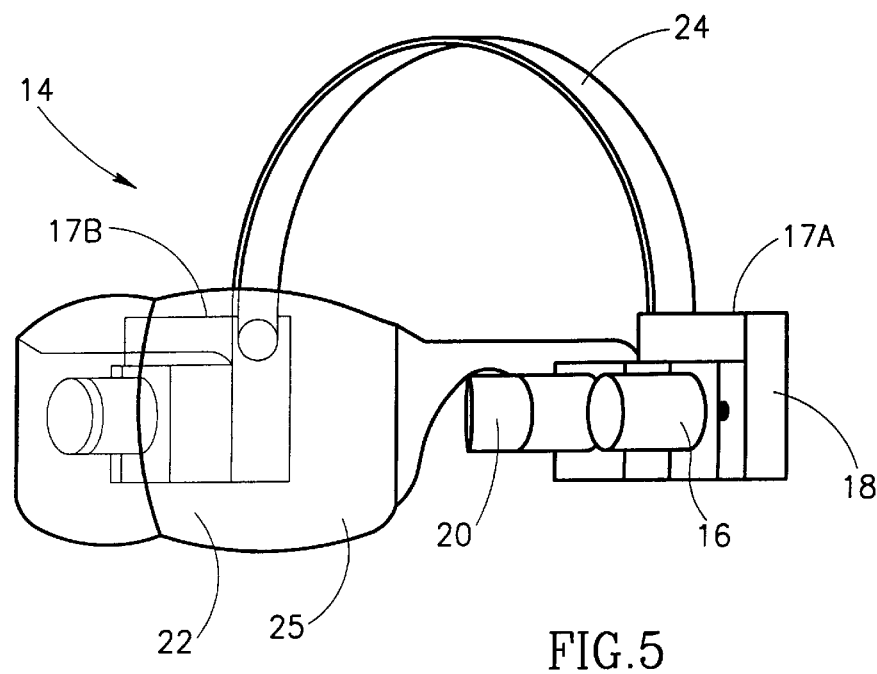
FIG. 5 is a schematic isometrix illustration of the head mounted display of FIG. 3.

Reference is now made to FIGS. 3, 4A, 4B and 5. FIG. 3 is a schematic isometrix illustration of a helmet 10 and a head mounted display 14, constructed and operative in accordance with a preferred embodiment of the present invention. FIG. 4A is a schematic side view of the helmet 10. FIG. 4B is a schematic top view of the helmet 10. FIG. 5 is a schematic isometrix illustration of the head mounted display of FIG. 1.

Helmet 10 includes a helmet body 12, and helmet mounted display 14 including a visor 22, a supporting arc 24, and optical systems 17A and 17B. According to the invention, the optical systems 17A and 17B are mounted on each side of the arc 24.

According to the present invention, the head mounted display 14 includes an interchangeable interface 18, mounted on the side of the arc 24, for receiving there-into an optical system such as optical system 17A. Each interchangeable interface 18 is modified especially for a specific pilot, taking into account the exact shape of his skull, the location of his eyes, the orientation of his pupils and the like.

Hence, the head mounted display 14 can be adjusted to a variety of head characteristics just by changing the interchangeable interface 18, regardless of any anthropometrix differences between different heads.

In the case of optical systems 17A and 17B the personal interface may be a personally shaped post. For the case of night vision goggles, supported on a helmet, the personal interface may be an individually shaped frame, into which each goggle is stuck. In this case, when the helmet is worn, the image is exactly in front of the eye of the pilot. Accordingly, the present invention eliminates the need for adjusting mechanisms, reduces the total weight of the helmet and adds to the accuracy of pointing in space.

According to the invention, the optical paths of each of optical systems 17A and 17B generally coincide with the imaginary plane formed by the eyes and the ears of the pilot. Therefore, the light is directed to visor 22 from the side and not from above, as in the prior art. This is significantly important since, the height of the projecting area 25 can be fixed, thus eliminating any vertical shifts of the projecting area 25 which, as will be readily appreciated, are extremely dangerous.

The optical systems 17A and 17B can be any combination of any type of vision, data or detection systems such as a night light intensifier, a data displaying system, a look in the eye detection system and the like.

The weight distribution of the helmet 10 is around the helmet rather than on top, as in the prior art. Thus, the helmet is far more balanced than prior art helmets, which use top or rear optical mounted devices.

According to the present embodiments, the optical systems 17A and 17B are mounted on the sides of the supporting arc 24. The visor 22 is also connected to the sides of the supporting arc 24 and is adapted to swing upward.

As can be seen in FIG. 5, the head mounted display 14, which includes the arc 24, the optical systems 17 and the visor 22, can be easily detached and removed from the helmet body 12 and replaced with other helmet accessories.

Referring back to FIG. 4B, after mounting the head mounted display 14 on the helmet body 12, the assembly can be attached to the helmet body 12 on either side, references 21 and 23. According to the present example, the supporting arc 24 is manufactured from flexible materials. Thus, mounting the display assembly 14 on different types of helmets is immediate and does not require special connecting arrangements to be predetermined on the helmet body 12 except of one connecting location. Such connecting location can be a hook, a Velcro connector and the like.

Furthermore, each of the optical systems 17A and 17B can be detached from the supporting arc 24 and replaced with a variety of optical units as described in detail herein after.

Reference is now made to FIGS. 6A, 6B, 6C and 6D, which are schematic pictorial illustrations illustrating the steps of wearing the helmet 10 including the head mounted display 14, according to the present invention.

Figure 6A:
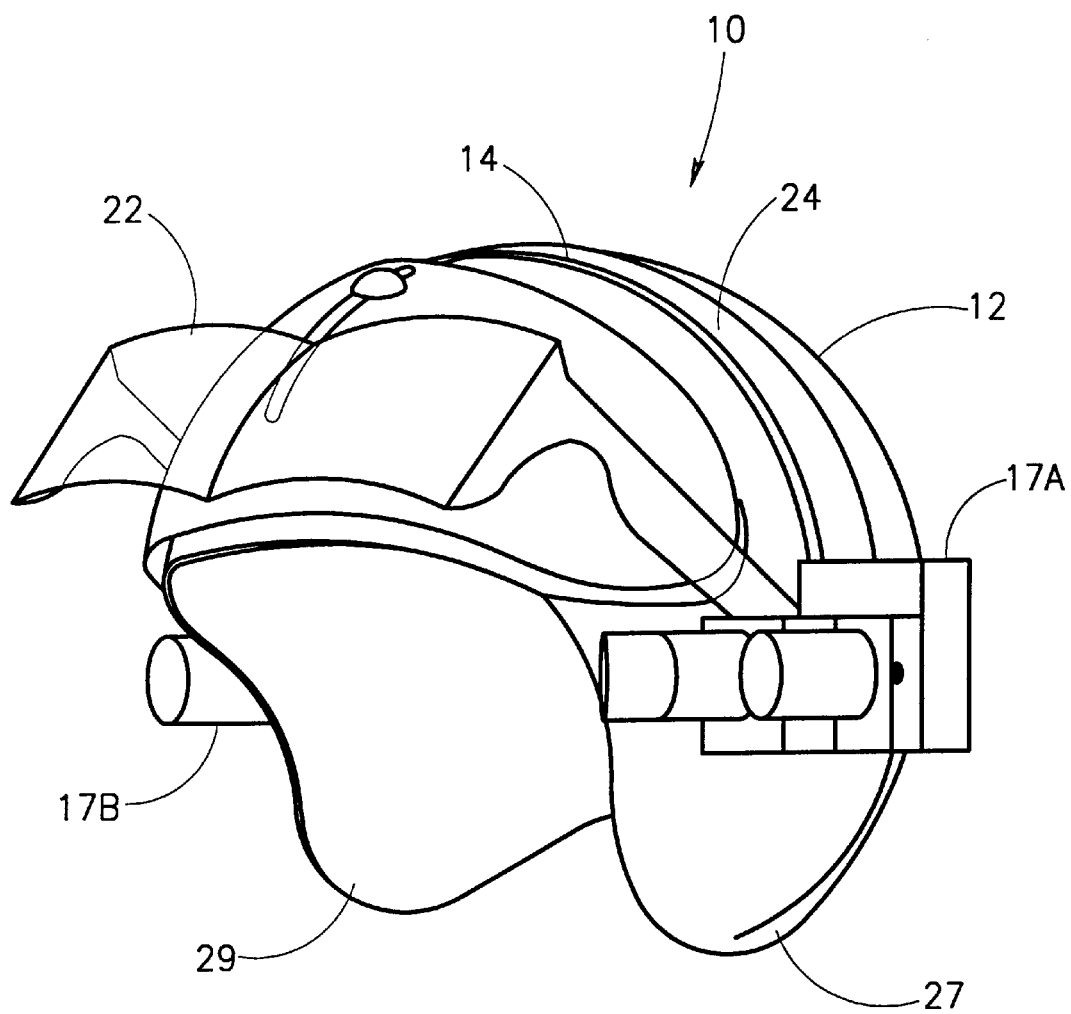
FIGS. 6A–6D are schematic pictorial illustrations illustrating the steps of wearing the helmet with the head mounted display of FIG. 3.
Figure 6B:
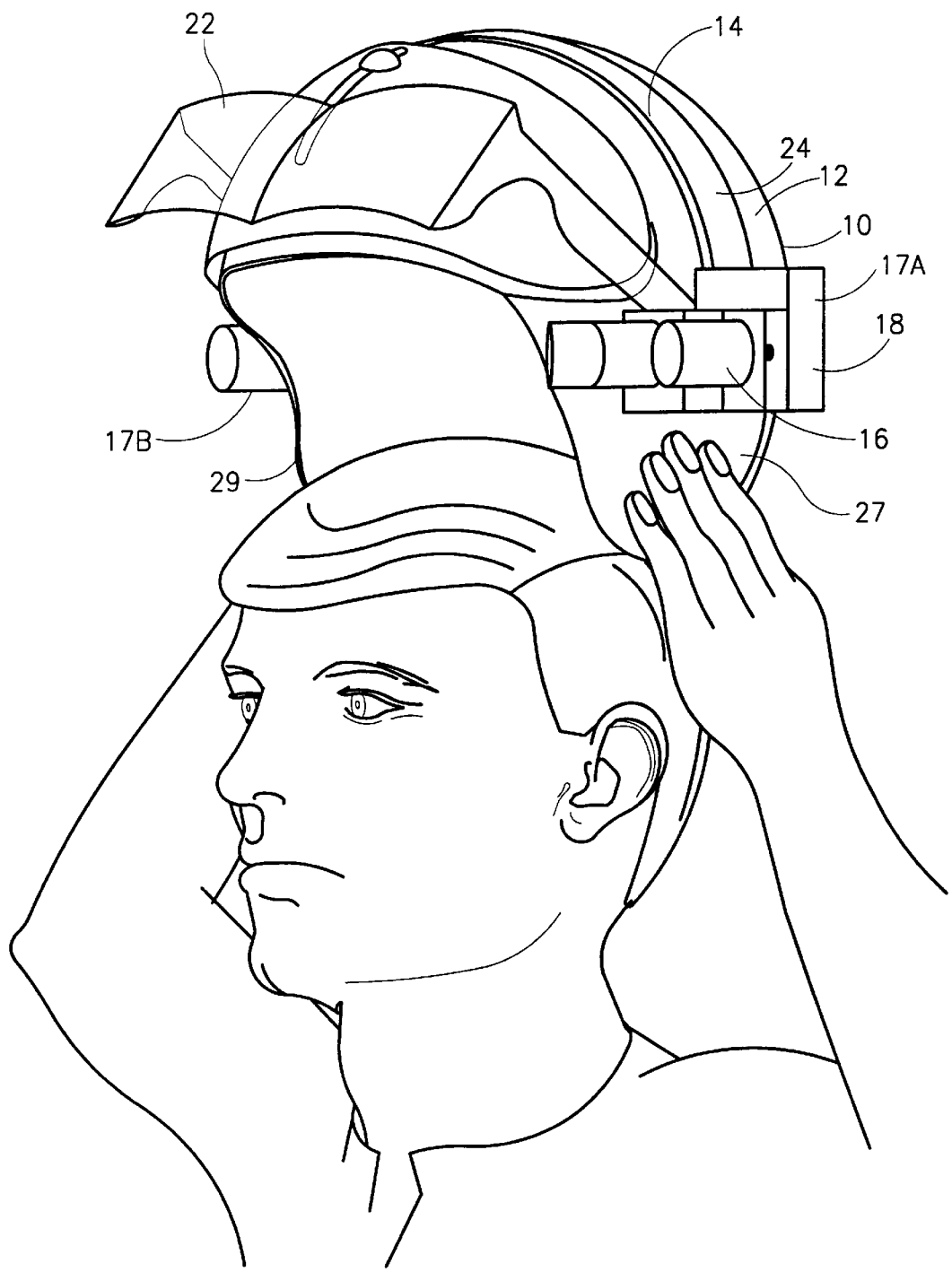
Figure 6C:
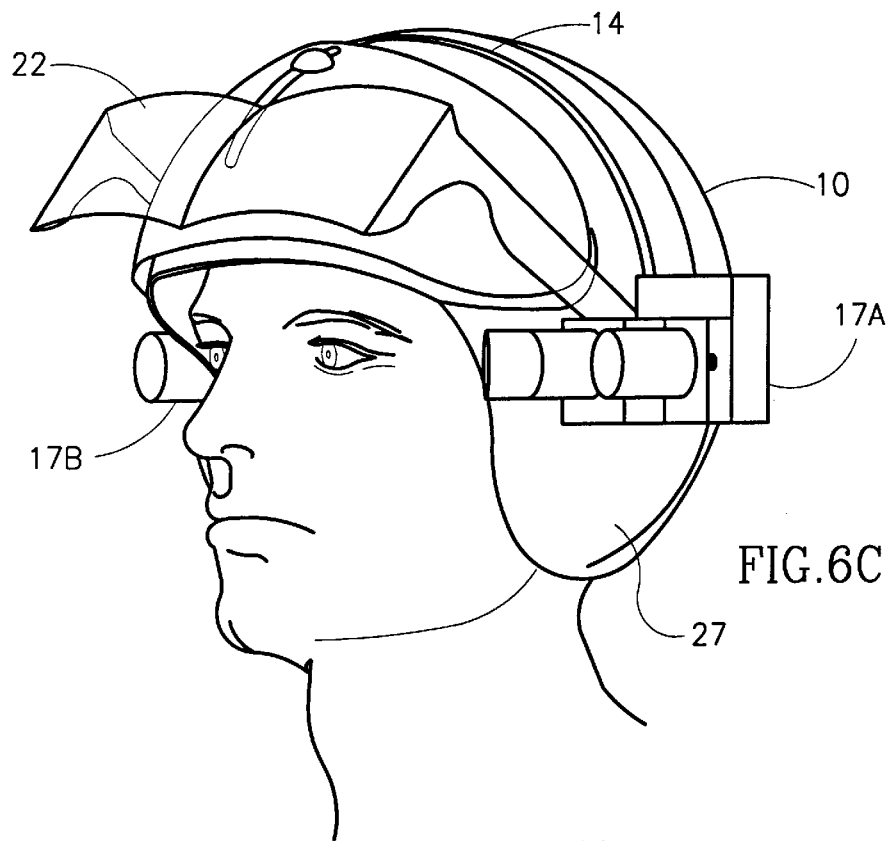

At first, the visor 22 is flipped up so as to maximize the open area provided to receive the head of the pilot. Then, as can be seen in FIG. 6B, the pilot holds both sides of the helmet body 12 and mounts the helmet on his head. Since the supporting arc 24 is made to be flexible, the pilot can pull both sides 27 and 29, of the helmet, away from each other in order to momentarily expand the open area provided to receive his head without changing the optical path of the head mounted display 14.

Figure 6D:
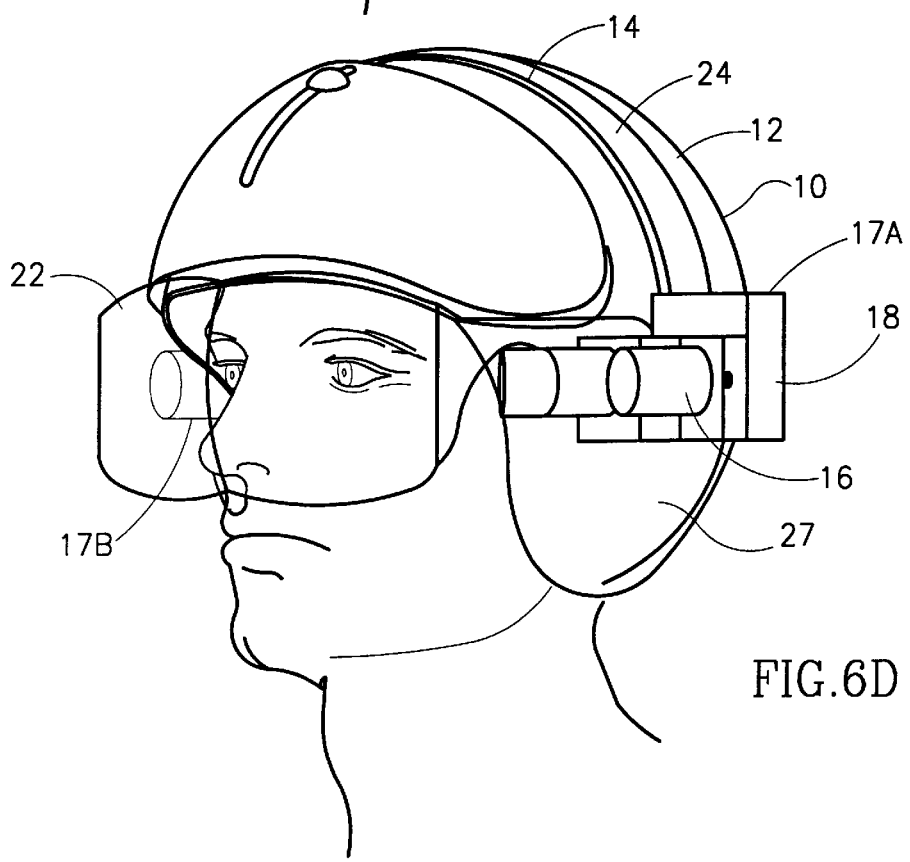

After the pilot mounted the helmet on his head (FIG. 6C), the visor can be flipped down (FIG. 6D).

According to the present invention, the visor 22 located relatively far from the eyes and face of the pilot. This unique structure of the helmet 10, combined with the above described way of mounting it on, enable pilots who wear eye glasses to put the helmet on and take it off, without removing their eye glasses.

Figure 7A:
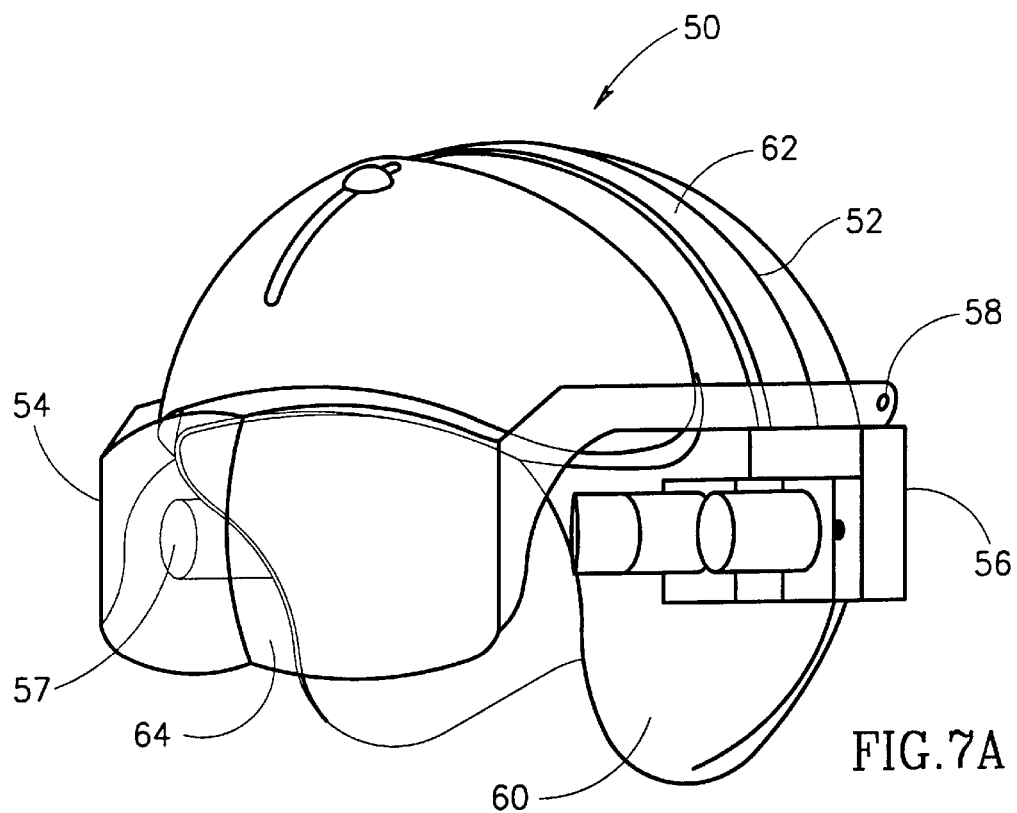
FIGS. 7A and 7B are schematic isometrix illustrations of a helmet, constructed and operative in accordance with another preferred embodiment of the present invention.
Figure 7B:
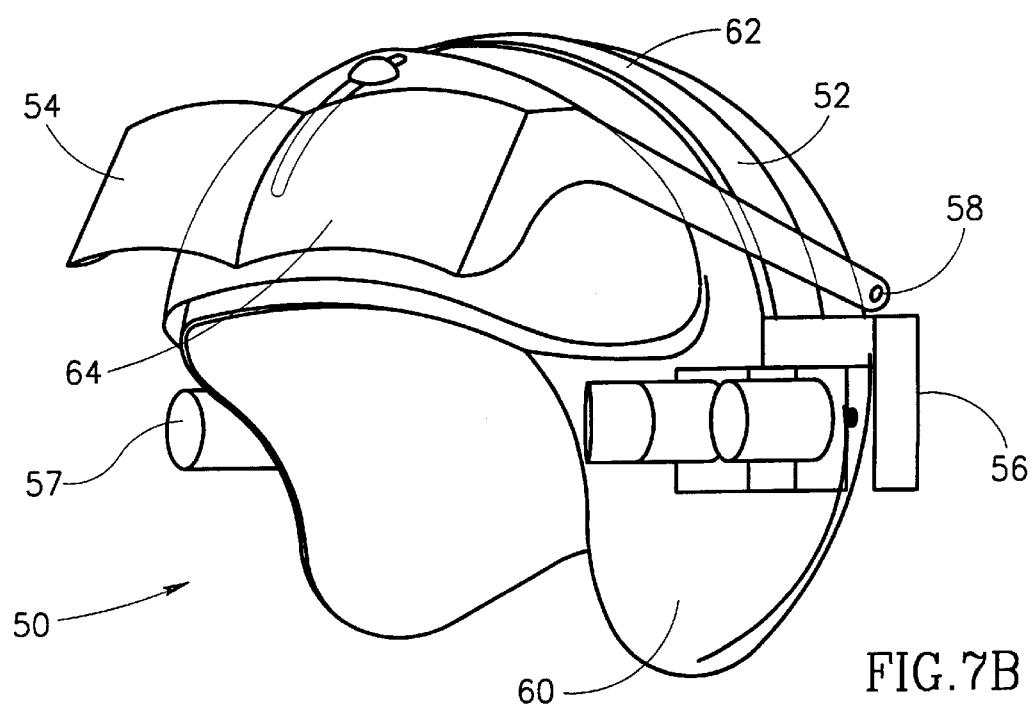

Reference is now made to FIGS. 7A and 7B which are schematic isometrix illustrations of a helmet, generally referenced 50, constructed and operative in accordance with another preferred embodiment of the present invention.

Helmet 50 includes a helmet body 60 and a head mounted display 52 which includes a visor 54, an arc 62 an optical system 56, attached on the left side of the visor 54 and an optical system 57, attached on the right side of the visor 54. Visor 54 is connected to arc 62 by a hinge 58, which allows it to rotate upward (FIG. 7B) and downward (FIG. 7A). Optical system 56 is firmly connected to the supporting arc 62 and thus, is firm in its position.

Figure 8:
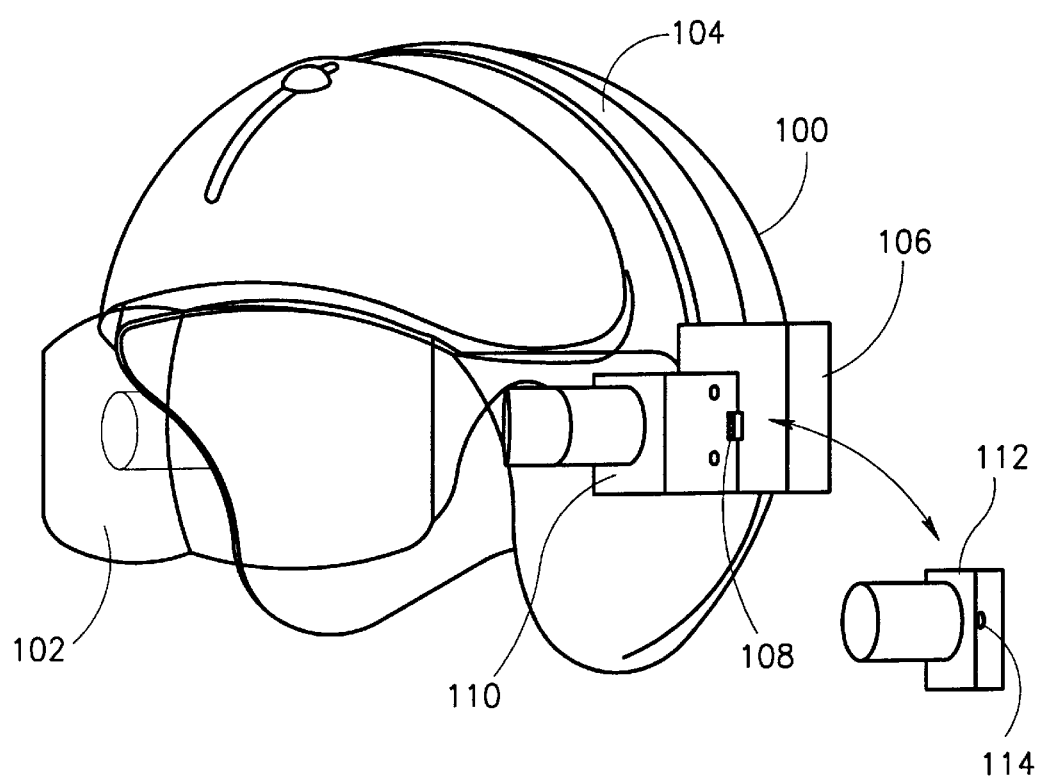
FIG. 8 is a schematic pictorial illustration of a helmet and an optical system detachable arrangement, constructed and operative in accordance with a further preferred embodiment of the present invention.

Reference is now made to FIG. 8 which is a schematic pictorial illustration of a helmet with an optical system detachable arrangement, constructed and operative in accordance with a further preferred embodiment of the present invention.

Helmet 100 includes a visor 102, an arc 104 and an optical system base 106. A first type of an optical system, which in the present example is a night light intensifier 110, is mounted on the optical system base 106. The night light intensifier 110 is secured on the optical system base 106 by a fast opening knob 108, which allows rapid attaching and detaching of the optical system to the optical system base 106.

The night light intensifier 110 can be replaced, for example, with a visor display unit 112, such as a Cathode Ray Tube (CRT) wherein the unit 112 also includes a fast opening knob 114. It will be appreciated that a securing mechanism can also be located on the optical system base 106.

An optical system which is mounted on the optical system base 106 can also be connected thereto via a communication interface (not shown) for intercommunication with an optical system mounted on the other side of the helmet 100 or with any airborne devices aboard the helicopter.

Figure 9:
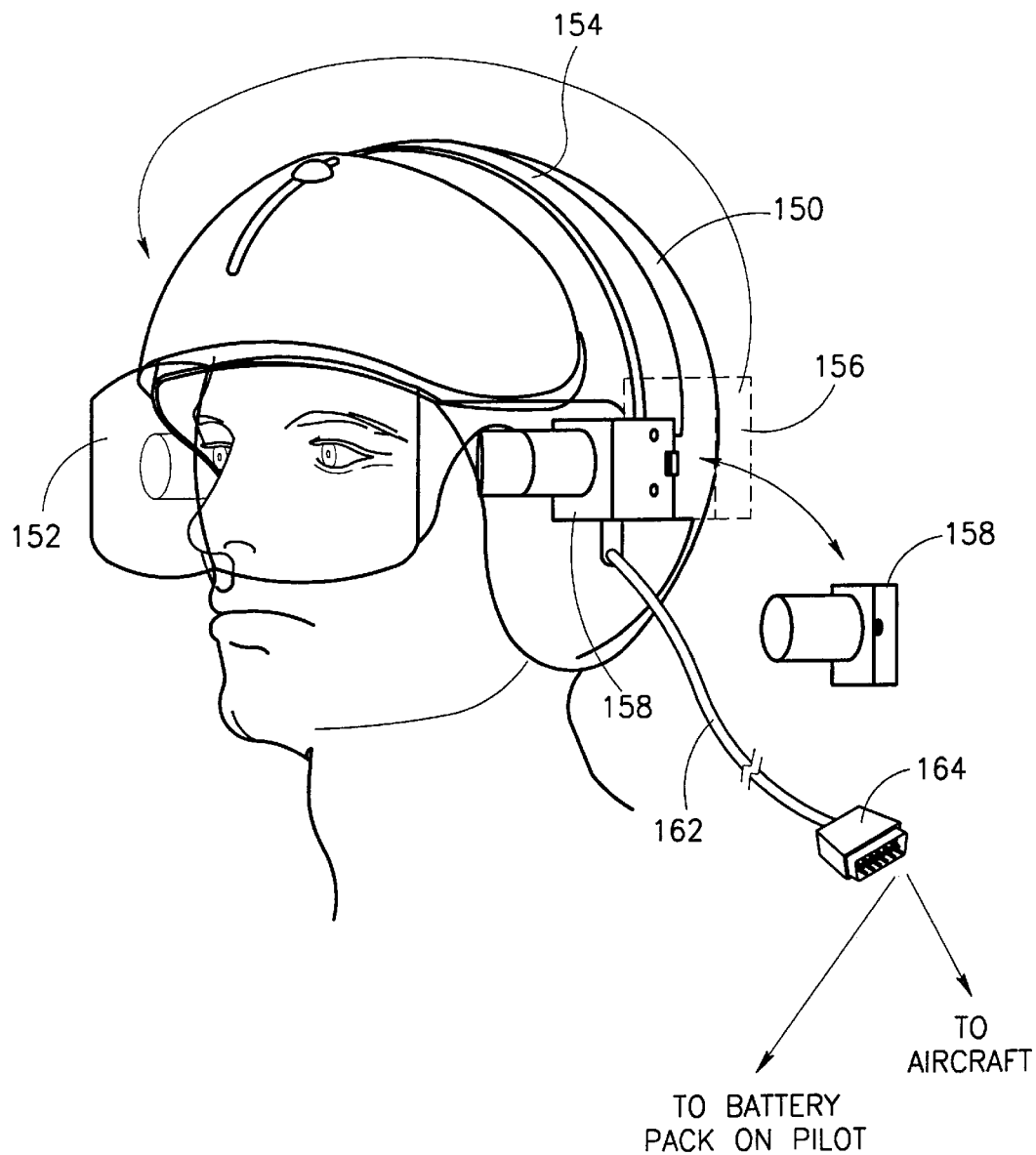
FIG. 9 is a schematic pictorial illustration of a helmet with a detachable CRT and a power supply connector, constructed and operative in accordance with yet another preferred embodiment of the present invention.

Reference is now made to FIG. 9 which is a schematic pictorial illustration of a helmet with a detachable CRT and a power supply connector, constructed and operative in accordance with yet another preferred embodiment of the present invention.

Helmet 150 includes an arc 154, a visor 152, an optical system base 156 and a communication and power cable 162. Similarly to helmet 100 of FIG. 8, helmet 150 is adapted for interchangeable optical systems. An optical system 158, which in the present example is a look in the eye detection device, is mounted on the optical system base 156.

The communication and power cable 162 can be connected either to equipment installed on board the helicopter for power supply and data exchange. The communication and power cable 162 can also connect to a power source worn by the pilot. This arrangement is extremely useful since it enables the pilot to be completely mobile, inside as well as outside the helicopter, with the helmet systems fully operational at all times.

Figure 10:
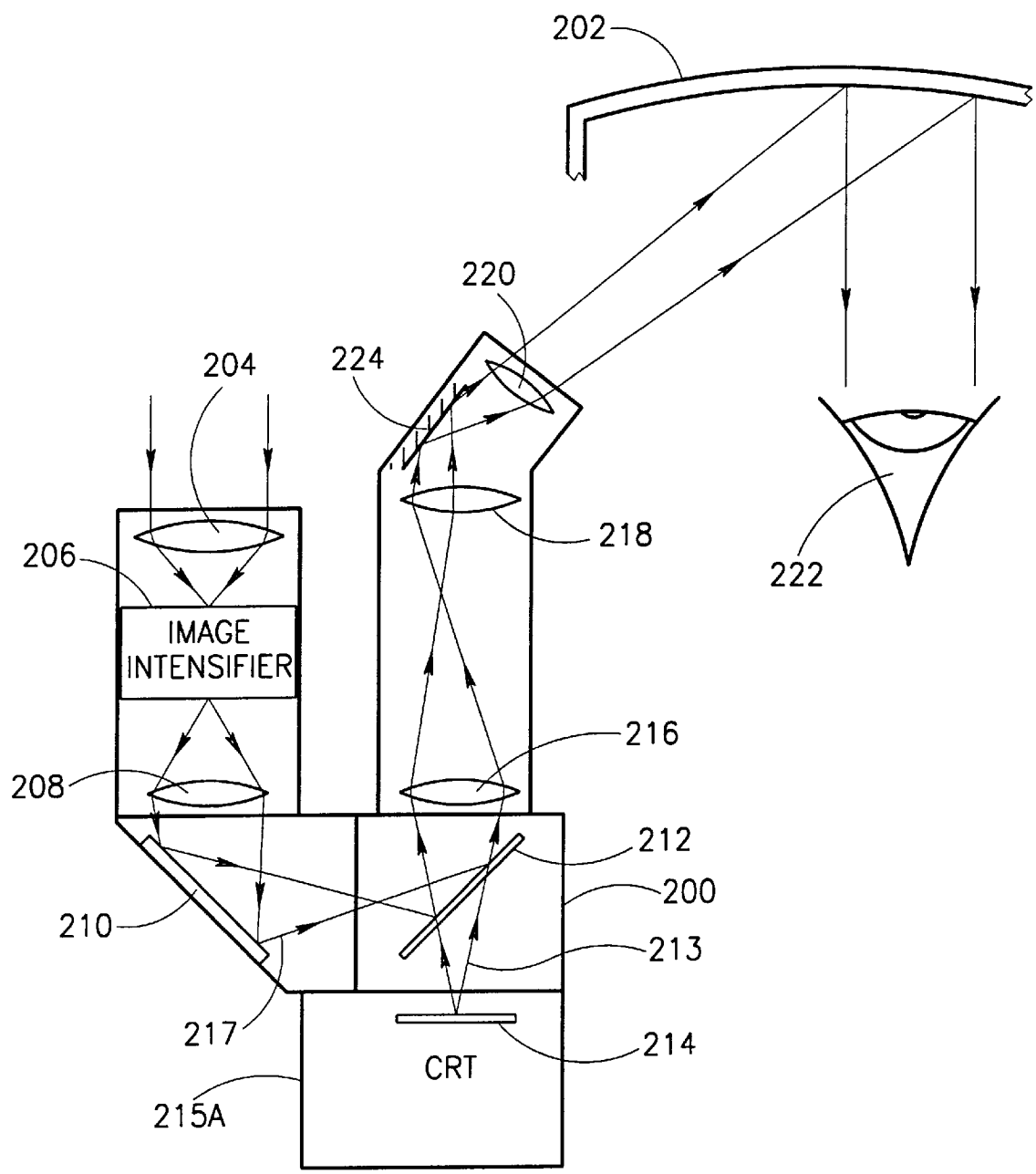
FIG. 10 is a schematic illustration of an optical system and the optical path therefore, constructed and operative in accordance with yet another embodiment of the invention.
Figure 11:
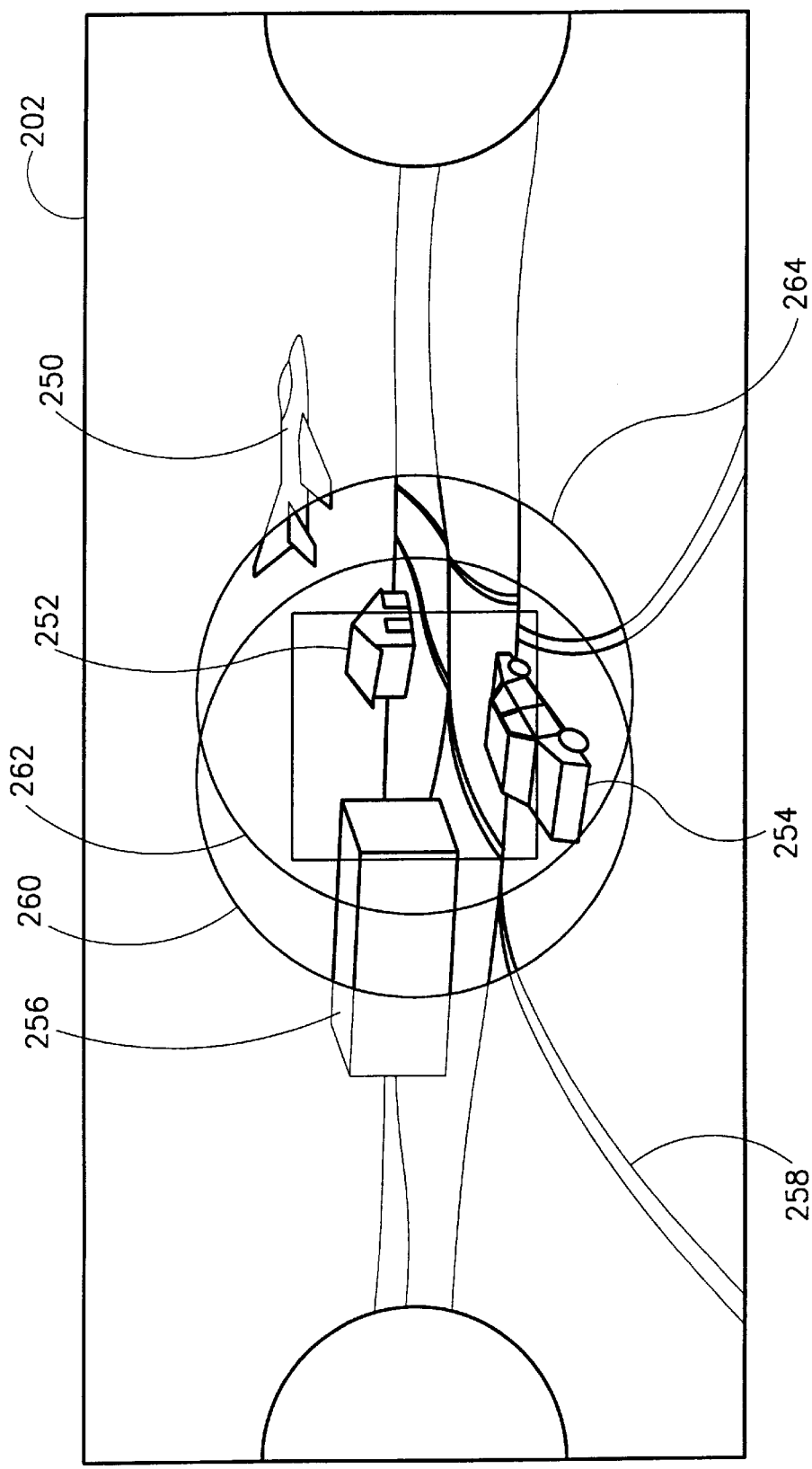
FIG. 11 is a schematic pictorial illustration of three simultaneous images of the flight route provided to the pilot.

Reference is now made to FIGS. 10 and 11. FIG. 10 is a schematic illustration of an optical system, generally designated 200, and the optical path therefore, constructed and operative in accordance with yet another embodiment of the invention. FIG. 11 is a pictorial illustration of the total superposed images formed on the visor 202 by system 200.

System 200 includes an image intensifier 206, a plurality of lenses 204, 208, 216, 218 and 220, a projecting unit 215, two mirrors 210 and 224 and a semi transparent mirror 212. According to the present example, projecting unit 215 includes a Cathode Ray Tube (CRT) 214.

Image intensifier 206 detects and image of a scenery through lens 204. The image intensifier 206 produces an intensified image (represented by light rays 217) of the scenery and directs it to mirror 210, through lens 208. Mirror 210 further directs the intensified 217 image to mirror 212.

CRT 214 generates a digital image (represented by light rays 213) and directs it through semi-transparent mirror 212. Semi-transparent mirror 212 combines the digital image with the intensified image and directs the combined images to the visor 202 via lenses 216 and 218, mirror 224 and lens 220. The combined image is then reflected from the visor 202 for viewing by the pilot, represented by an eye 222.

Referring now to FIG. 11, the total image formed on the visor 202 includes a combination of three images. A first image, which includes the images of airplane 250, house 252, car 254, container 256 and road 258, is an image of the scenery. A second image, which includes circles 260 and 264 is the image detected by image intensifier 206. This image includes intensified details of objects of the first image, which are included therein. For example, the image intensifier 206 detects the image of car 254 and provides an image of it, which adds to the first image. In FIG. 11, this is represented by thickening the lines of objects in circles 260 and 264. The third image displayed on square 262, is a digital image formed by the CRT 214. It will be appreciated that CRT 214 is operative to produce digital images which include any type of aeronautical instrument data such as altitude, latitude, firing information and the like.

Figure 12:
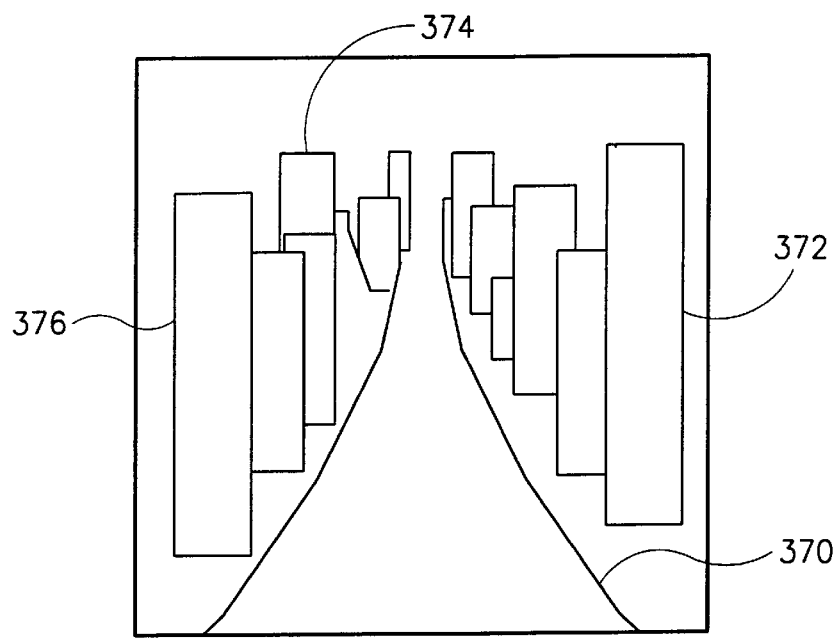
FIG. 12 is a pictorial illustration of an image which is projected by an optical system on a visor.

Reference is now made to FIG. 12 which is a pictorial illustration of a superposed images formed on the visor 202 by system 200. The image includes an image of a road 370 and images of targets, generally referenced 372, 374 and 376.

The system 200 is a modular system which is operative to provide different interchangeable projecting units 216.

Figure 13A:
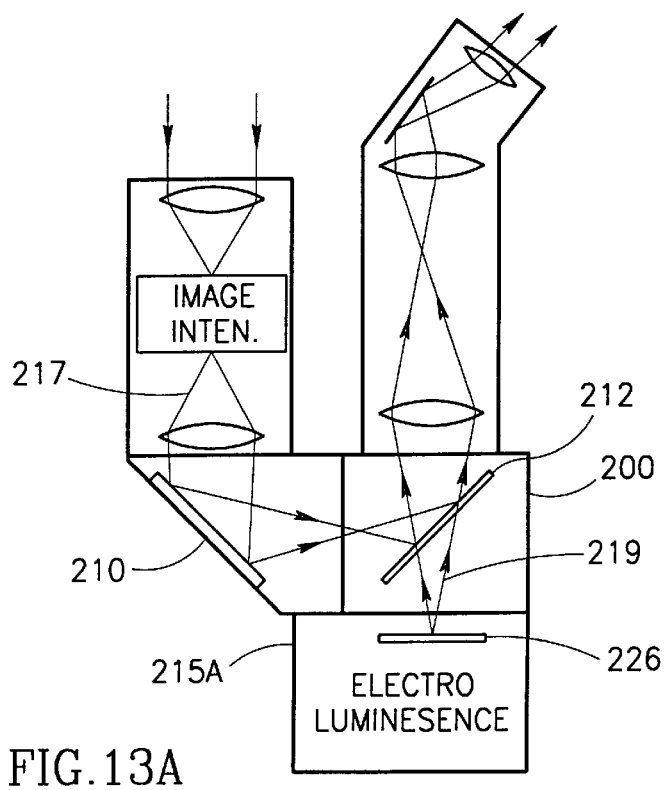
FIGS. 13A–13C are schematic illustrations of three alternative preferred embodiments of the optical path of light provided from the light intensifier and an additional illuminating unit to the visor, functioning also as a combiner.
Figure 13B:
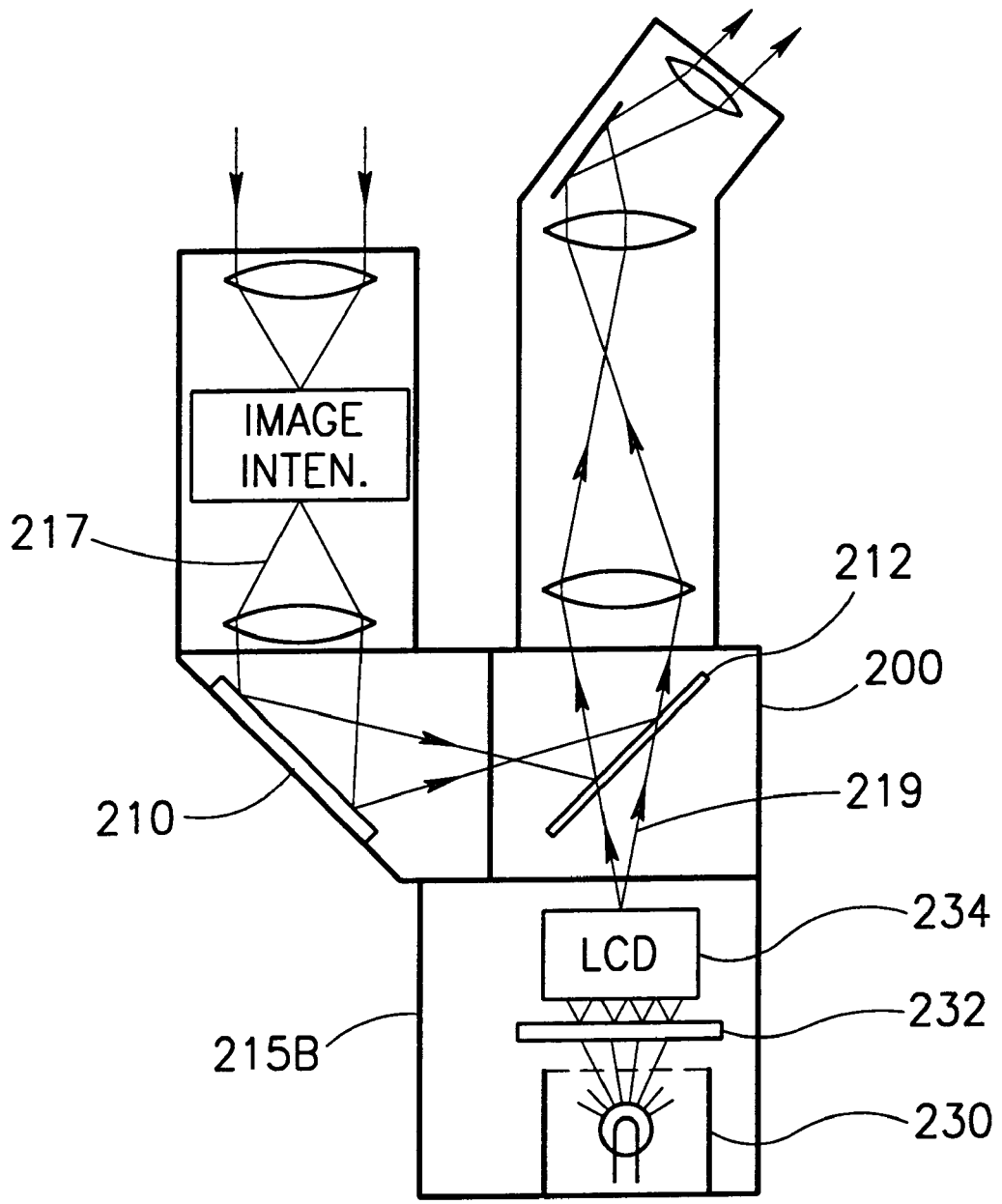
Figure 13C:
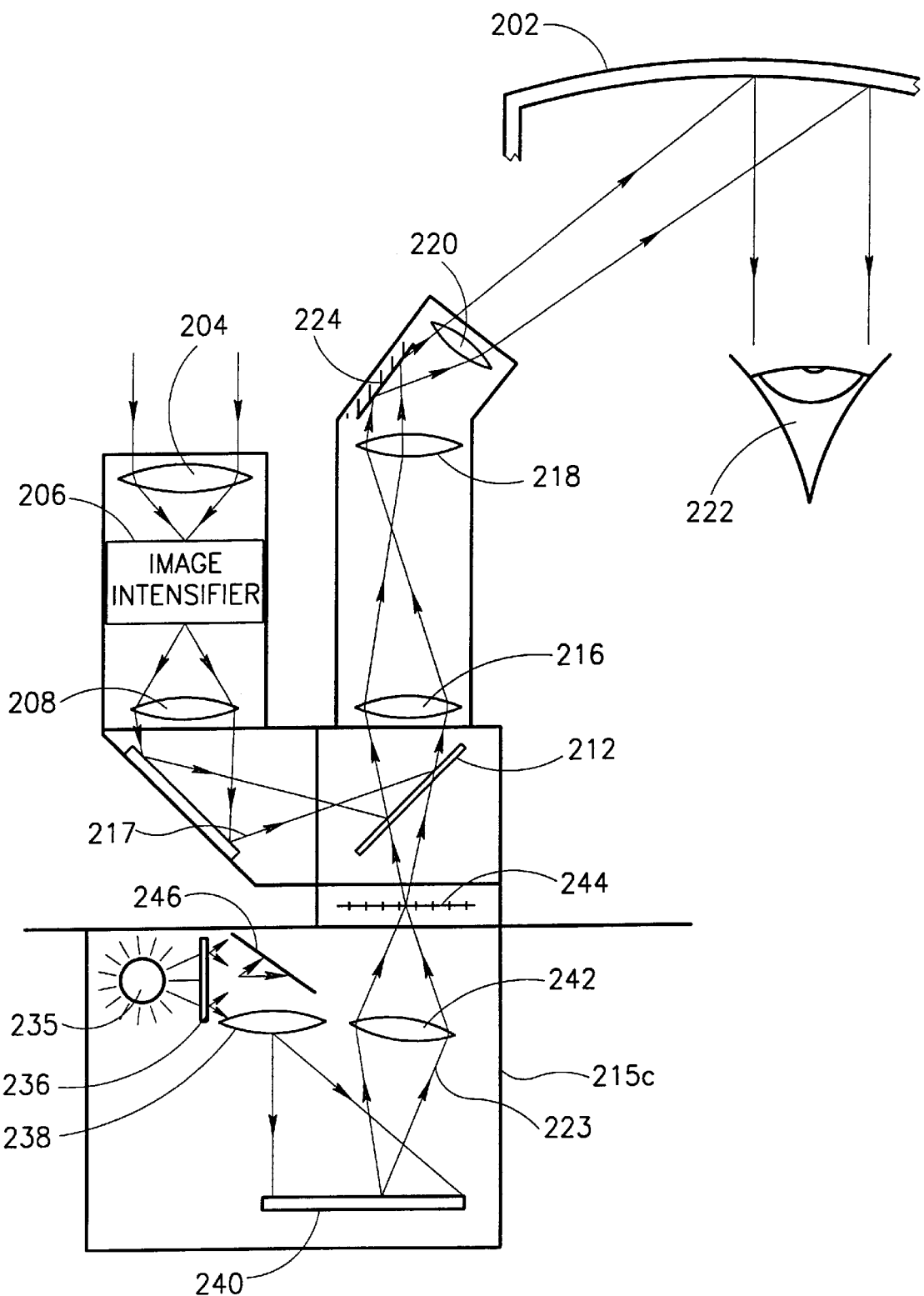

Reference is now made to FIGS. 13A, 13B and 13C, which are partial schematic illustrations of optical system 200 and the optical path therefore, constructed and operative in accordance with further embodiments of the invention.

In the embodiment shown in FIG. 13A, the system 200 includes a projecting unit 215A which includes an electro-luminance element 226. The electro-luminance element 226 generates a digital image (represented by light rays 219) and directs it at semi transparent mirror 212. The semi-transparent mirror 212 combines the digital image with the intensified image and further directs the combined image through the lenses of system 200 towards visor 202.

In the embodiment shown in FIG. 13B, the system 200 includes an illuminating unit 215B which includes a light source 230, a screen 232 and a Liquid Crystal Device (LCD) 234. Light source 230 generates a light beam and directs it to screen 232. The screen 232 spreads the beam evenly and further directs it to the LCD 234. The LCD 234 controls and moderates passage of the light beam therethrough and thus produces a digital image (represented by light rays 221). The digital image is further directed to semi transparent mirror 212 which combines it with the intensified image and further directs the combined image trough the lenses of system 200 towards visor 202.

In the embodiment shown in FIG. 13C, the system 200 includes an illuminating unit 215C which includes a light source 235, a screen 236, two lenses 238 and 242, a mirror 246 and a computer controlled mirror based device 240. The computer controlled mirror based device 240 can be a Deformable Mirror Device, a Digital Mirror Device (DMD) and the like.

Light source 235 generates a light beam and directs it to screen 236. The screen 236 spreads the beam evenly and further directs it to the computer controlled mirror based device 240, via mirror 246 and lens 238. The computer controlled mirror based device 240 reflects some of the light, thus producing a digital image (represented by light rays 223). The digital image is further directed to semi transparent mirror 212, via lens 242 and mask screen 244. The semi transparent mirror 212 combines the digital image with the intensified image and further directs the combined image through the lenses of system 200 towards visor 202.

Reference is made to FIG. 14A which is a schematic illustration of a prior art circuit, referenced 6, for controlling the operation the intensity of a CRT of a night light intensifier. The power circuit 6 includes a Cathode Ray Tube 2 (CRT) and a power supply unit 4, which is connected thereto. The power supply unit provides power to the CRT 2 and the CRT 2 provides feedback information to the power supply unit 4, so as to moderate the amount of power supplied therefrom, according to a predetermined level. These circuits do not enable the pilot to intervene in the feedback process so as to adjust the intensity according to his needs.

FIG. 14B is a schematic illustration of a circuit, generally referenced 306, for controlling the operation of a CRT, constructed and operative in accordance with a preferred embodiment of the invention.

Circuit 306 includes a Cathode Ray Tube 300 (CRT), a power supply unit 302, and a variable resistor 304. The power supply unit 302 is connected to the CRT 306, providing power thereto. The CRT 306 provides feedback information to the power supply unit 302, so as to moderate the amount of power supplied therefrom, according to a selected level. The variable resistor 304 interconnects between the power supply unit 302 and the CRT 306 and enables the user to select an intensity level according to his needs.

Figure 16:
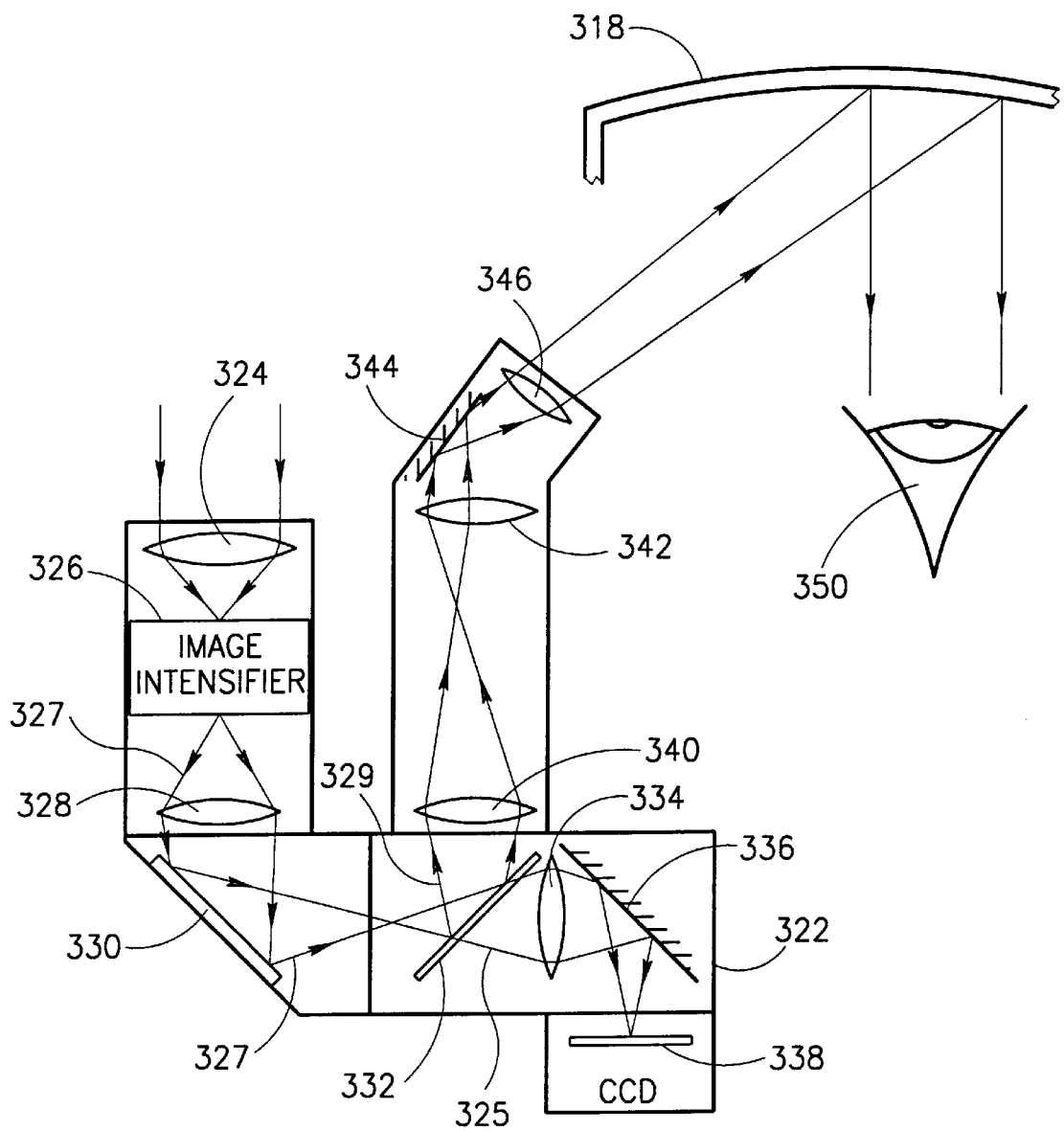
FIG. 16 is a schematic illustration in detail of the electro-optical system of FIG. 15 and the optical path of light rays therein.
Figure 15:
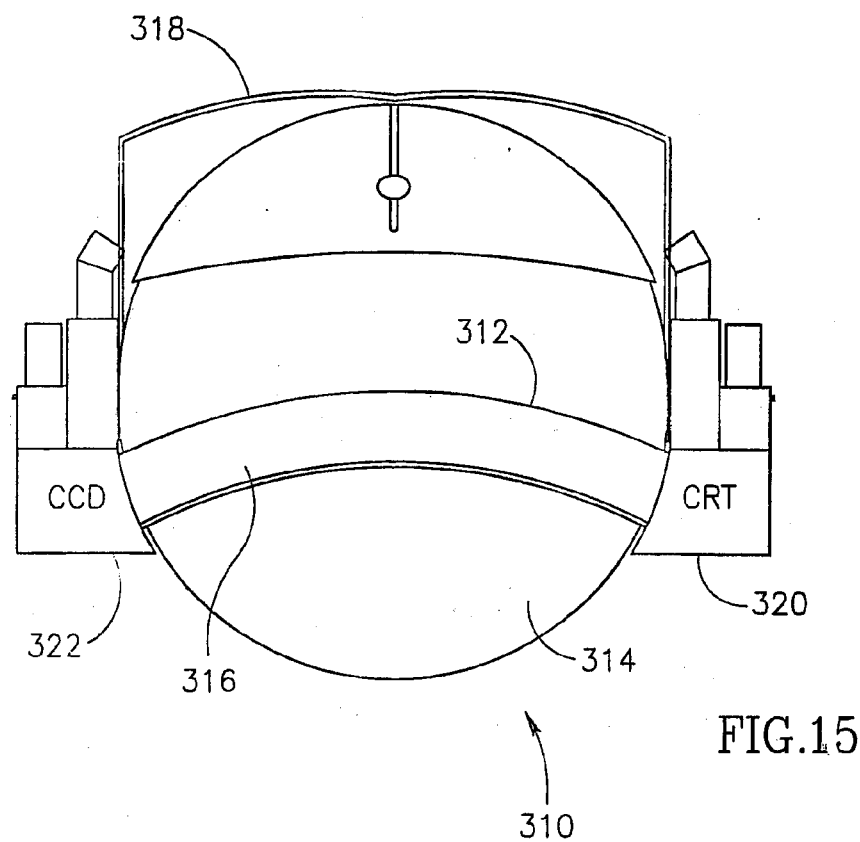
FIG. 15 is a top view schematic illustration of a helmet system constructed and operative with a recording unit in accordance with another preferred embodiment of the present invention.
Figure 20:
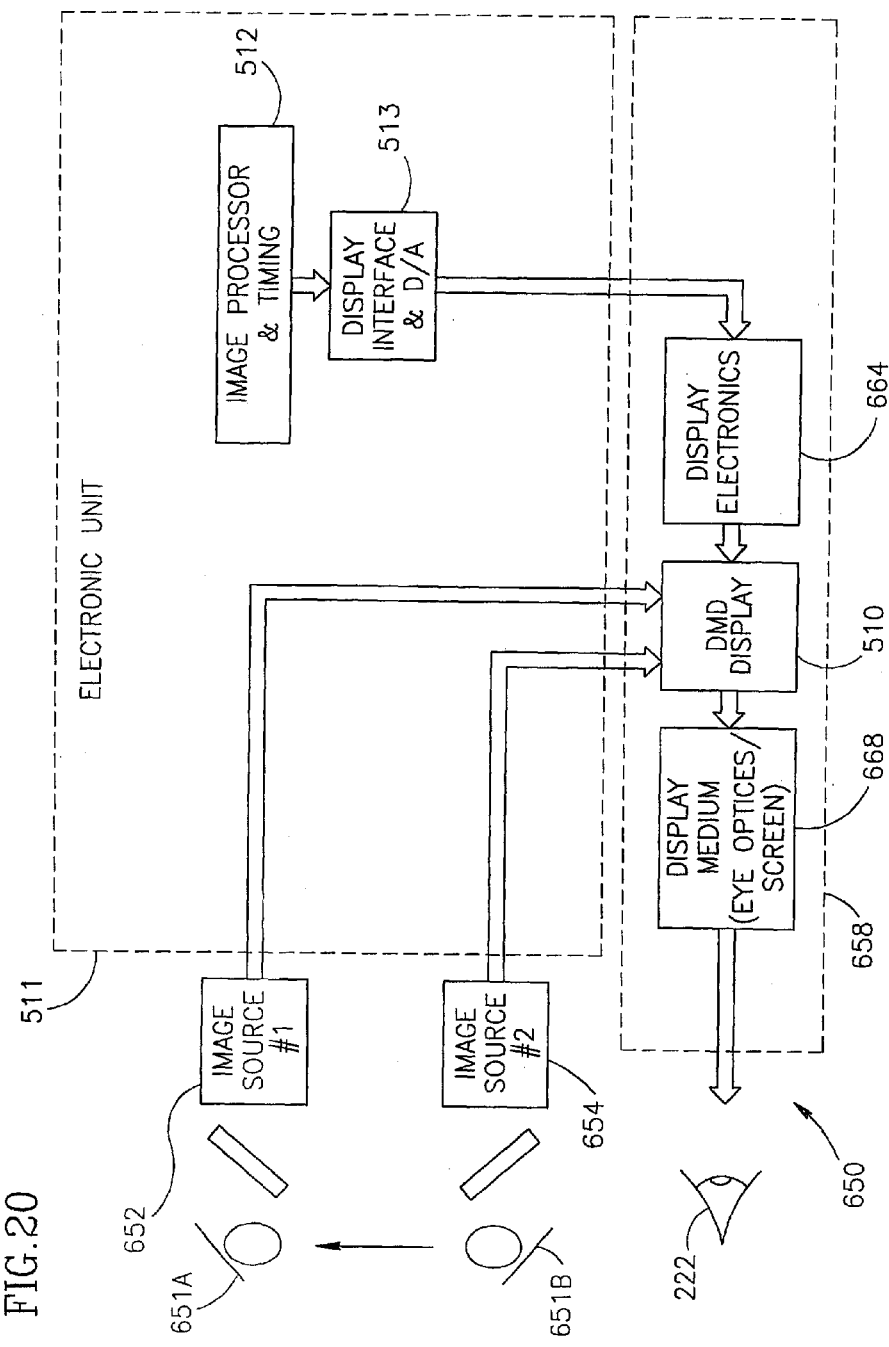
Figure 21:
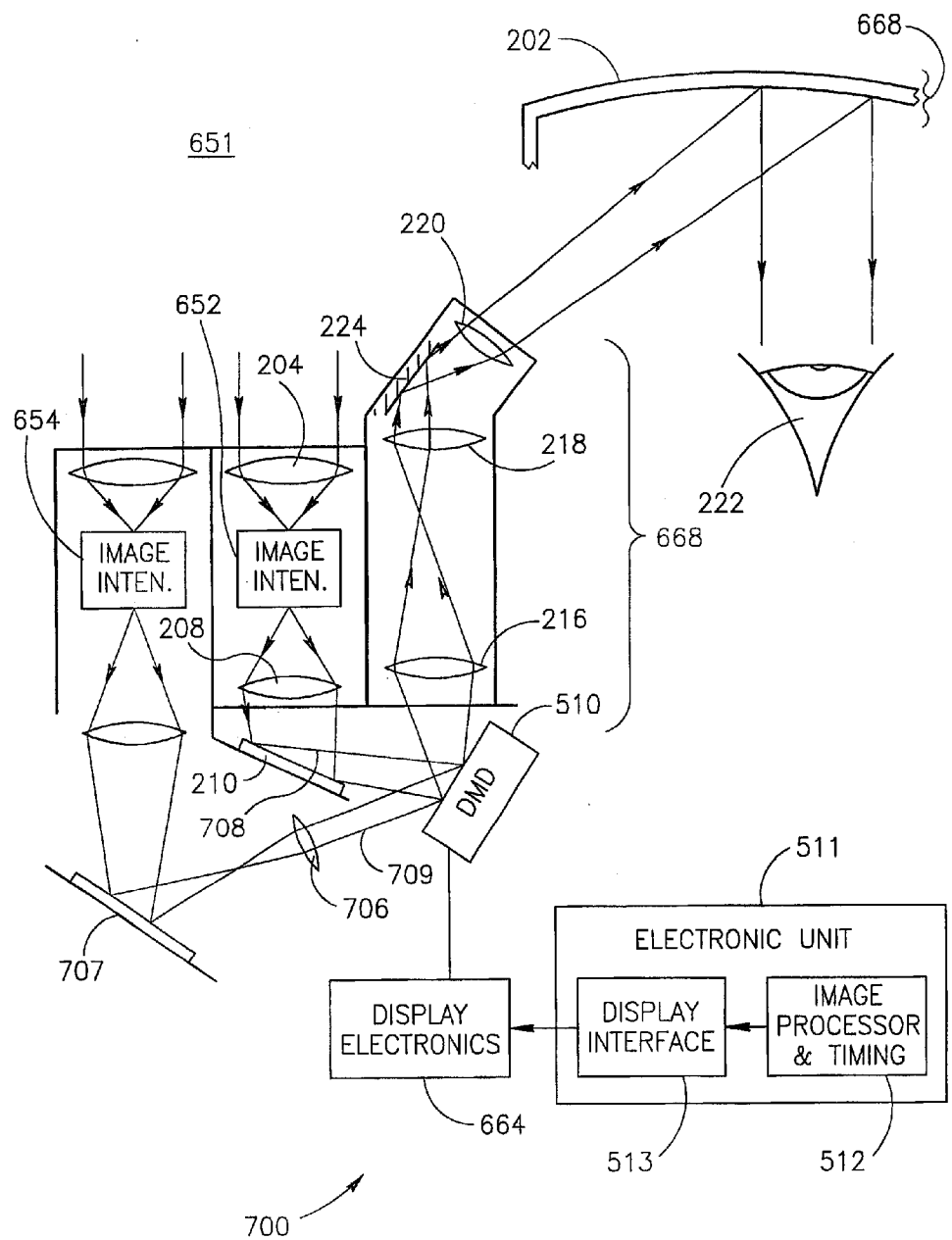

Reference is now made to FIGS. 15 and 16. FIG. 15 is a top view schematic illustration of a helmet with a head mounted display, constructed and operative with a recording unit in accordance with another preferred embodiment of the present invention. The helmet system 310 includes a helmet body 314 and a head mounted display 312 mounted thereon. Head mounted display 312 includes a rigid arc 316, a visor 318, an electro-optical system 320 and a recording system 322. The electro-optical system 320 is a CRT based system which is similar to system 200, described hereinabove with reference to FIG. 11. The recording system 322 is a Charge Coupled Device (CCD) based unit for recording the image intensified by the right light intensifier.

FIG. 16 is a schematic illustration of the recording system 322 and the optical path of light rays therein. The electro-optical system 322 includes a light intensifier 326, a Charge Coupled Device 338 (CCD), lenses 324, 328, 334, 340, 342 and 346, mirrors 330, 336 and 344 and a splitting element 332. Light intensifier 326 detects and image of a scenery, through lens 324.

The light intensifier 326 produces an intensified image (represented by light rays 327) of the scenery and directs it to mirror 330, through lens 328. Mirror 328 further directs the intensified image to splitting element 332. The splitting element 332 splits the image 327 into a first image (represented by light ray 325) and a second image (represented by light ray 329).

The first image 325 passes through the splitting element 332 and directed to mirror 336 via lens 334. The mirror 336 further directs the image 325 to CCD 338. The CCD 338 detects the image 325, converts it to digital data and transfers the digital data to a storage unit thereby completing a procedure of image recording.

The second image 329 is reflected from the splitting element 332 and further directed to mirror 344, via lenses 340 and 342. Mirror 344 reflects the second image 329 towards the visor 318, via lens 346. Pilot, represented by eye 350, is able to see the second image 329 being reflected from the visor 318.

A method of solving the difficulties associated with optimizing combiner performance between day and night, apart from using different combiners, is to utilize a digital micromirror display (DMD), produced by companies such as Texas Instruments of Dallas, Tex., U.S.A. or a reflective active metrix-LCD (R-LCD) unit in place of the combiner. R-LCD units are produced by companies such as Displaytech of Longmont, Colo., U.S.A. Microdisplay Corporation of San Pueblo, Calif. U.S.A., or CRL of Middlesex, UK, or any other type of pixelated addressing device.

DMD's and R-LCD units facilitate pixel by pixel intensity control of direct and indirect images giving the combiner the flexibility to operate at this optimum under all conditions. The DMD and the R-LCD further provide the user the flexibility to shift between one or more received images on a pixel by pixel basis, thus providing a time-shared combiner. Furthermore, the DMD can be utilized to generate symbology without the use of a CRT.

For purposes of the explanation herein, all references to a direct image refer to an image which is formed without image processing or transferring, and all references to an indirect image refer to an image which is formed with image processing or transferring.

Figure 17A:
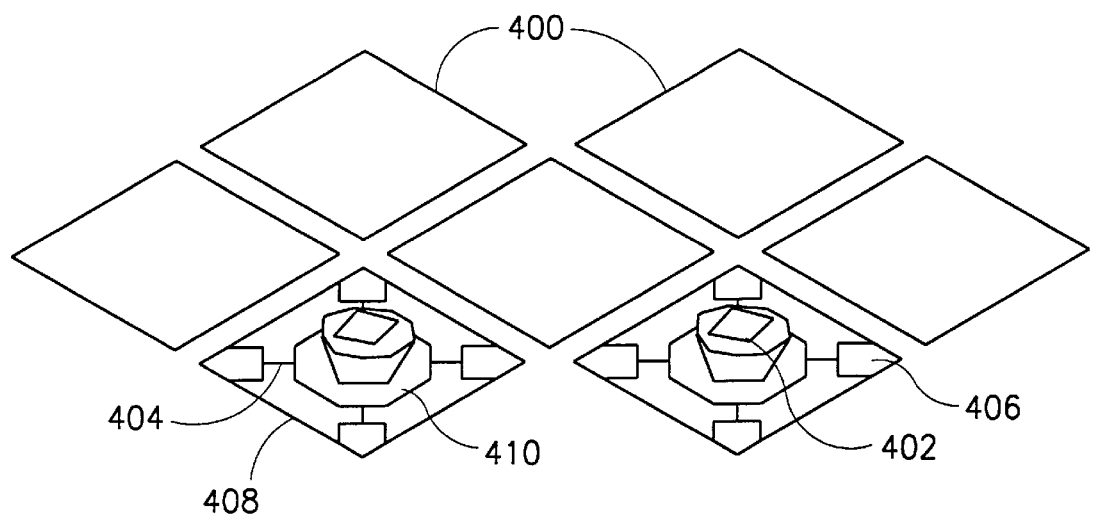
FIG. 17A is a prior art schematic illustration of the geometry of a DMD.
Figure 17B:
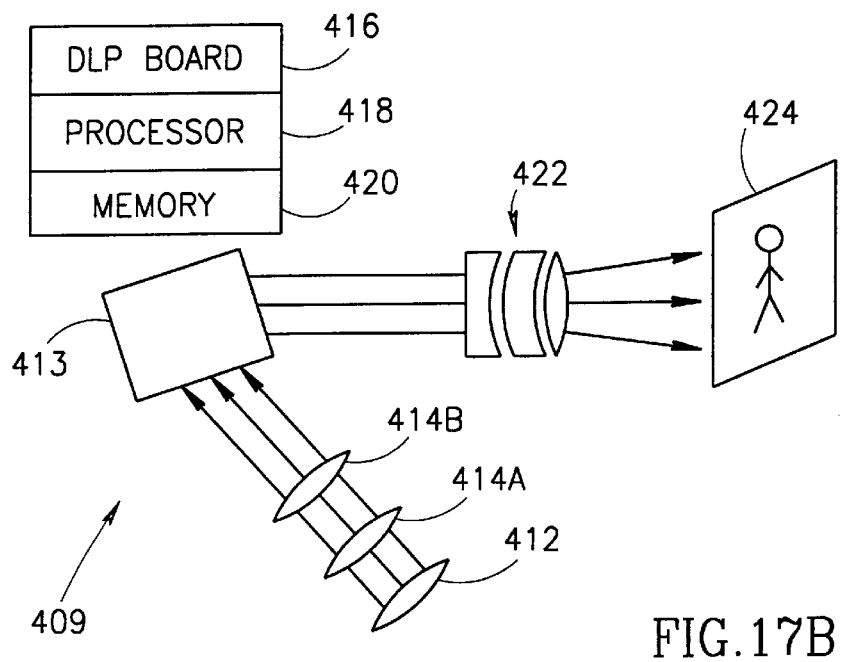
FIG. 17B is a prior art utilization of a DMD utilized to produce a projected digital image.

Reference is now made to FIGS. 17A and 17B which show a DMD, such as that produced by Texas Instruments of Dallas, Tex., U.S.A. A DMD is a mirror for reflecting light, which has individually rotatable mirrors for deflecting light operable at the level of pixels. FIG. 17A shows the configuration at the surface and FIG. 17B shows the DMD in use as a means of directly generating a digital image in a projection TV.

As shown in FIG. 17A, each DMD is made up of a large number of rotatable mirrors 400. Mirrors 400 are capable of movement to deflect the angle of their surface. Each mirror (addressable) 400 is mounted on a mirror support post 402 attached to a torsion hinge 404 supported by at least one hinge support post 406. Torsion hinge 404 facilitate torsional deflection of the surface of each mirror 400. The deflection occurs about a diagonal axis joining two hinge support posts 406. Rotation is facilitated by an address electrode 408 and the mirror 400 is stopped by a landing tip 410.

As shown in FIG. 17B, a DMD is used to generate a digital image on a screen, such as in a projection TV system. A white light source 412 is focusing by lenses 414A and 414B and a Digital Light Processing (DLP) board 416 onto a DMD 413. A processor 418 and a memory 420 converts the deflected light into a video signal which is stored in a memory 420. This action is executed simultaneously for all the DMDs 413, each pixel generating a separate frame or image. The video signal is retrieved from memory 420, and a projection lens 422 then generates an image on a screen 424.

Thus a digital image is directly generated. A color picture is created by rotating a spectral filter through the white beam allowing red, green or blue to pass through it at a rate which is faster than the human eye can detect, thus three color pictures with the same intensity distribution are superimposed for each frame. Alternatively, using a color beam splitter, each pixel is time modulated by switching the mirror on or off rapidly switching with respect to each color, in addition to the intensity pattern.

Figure 18A:
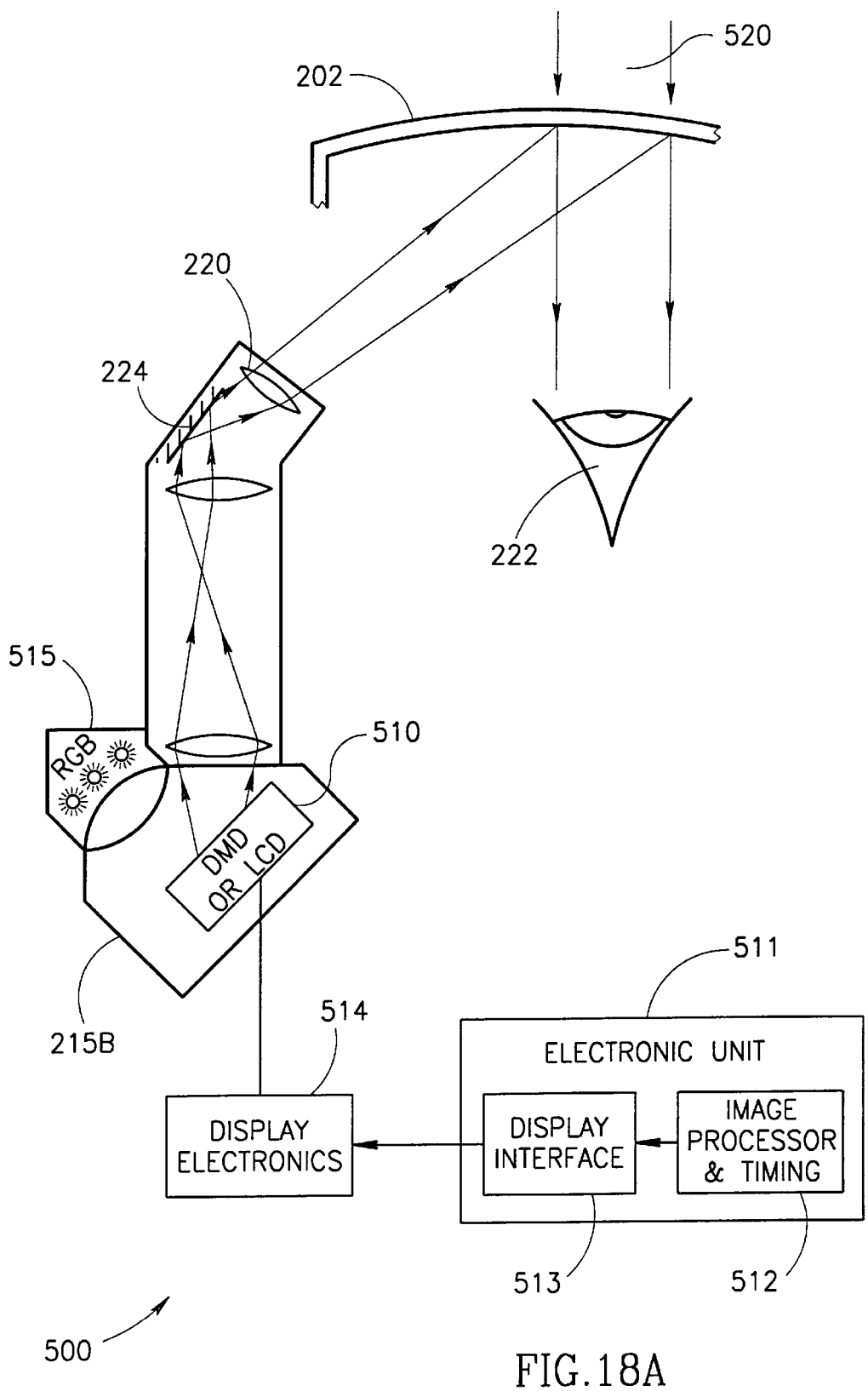
FIG. 18A is a partial schematic illustration of an optical system according to a preferred embodiment of the invention for a reflection device generated symbology image superimposed on an external scene in a HMD.
Figure 18B:
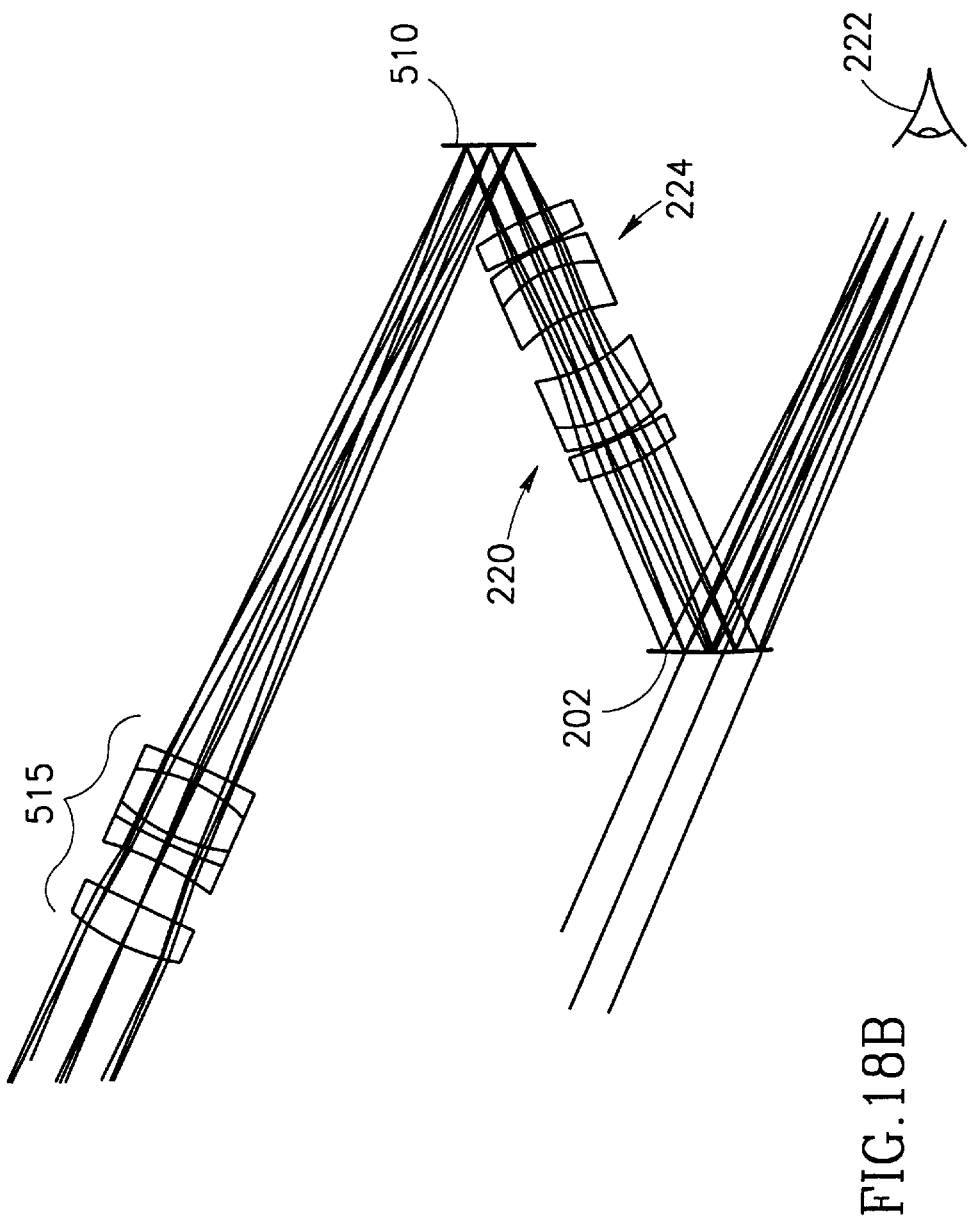
FIG. 18B is an illustration of the optical design of the optical system of FIG. 18 and the optical path of light rays therein.
Figure 19A:
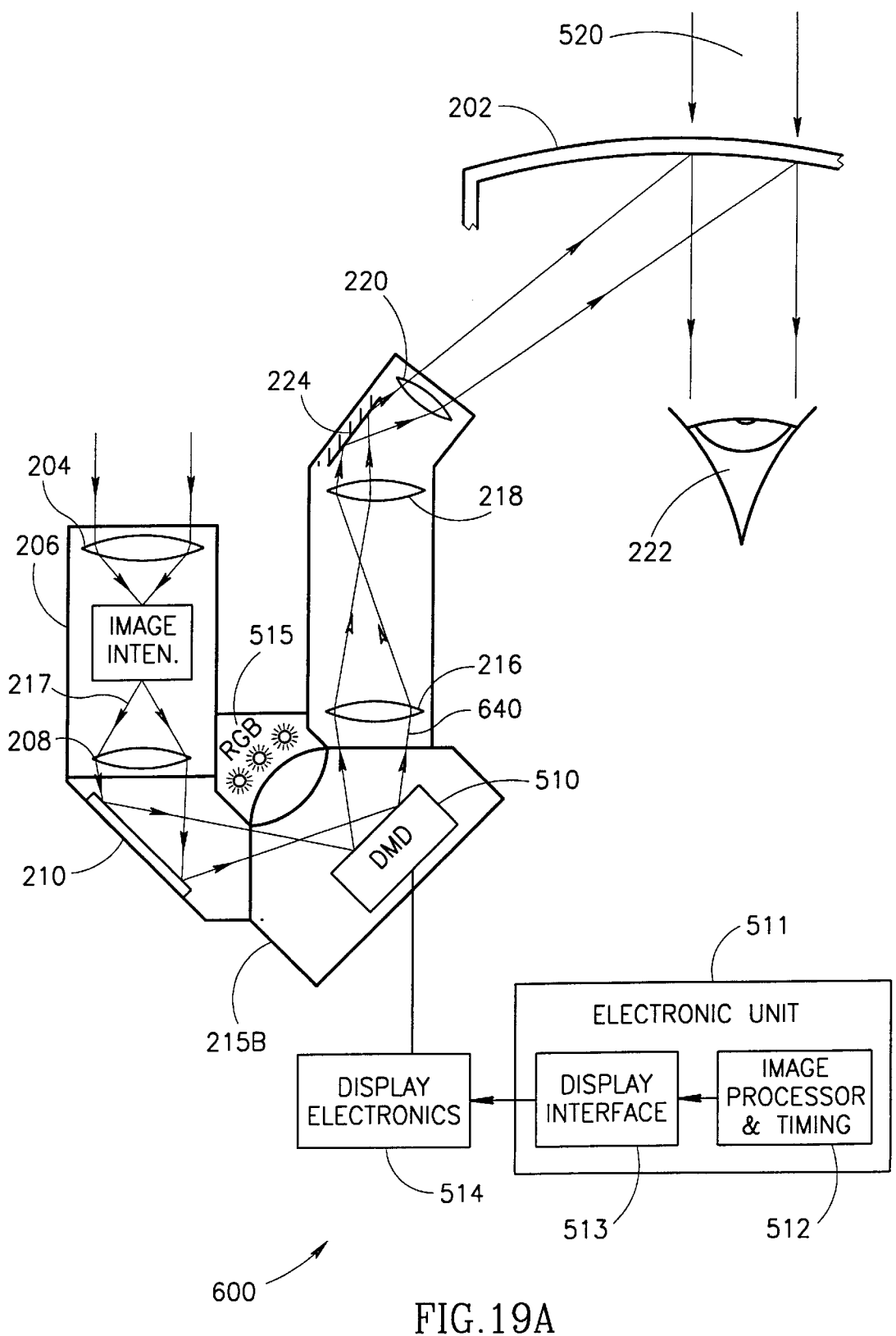
FIG. 19A is a partial schematic illustration of an optical system utilizing a DMD generated symbology image superimposed on an indirect image in a HMD.
Figure 19B:
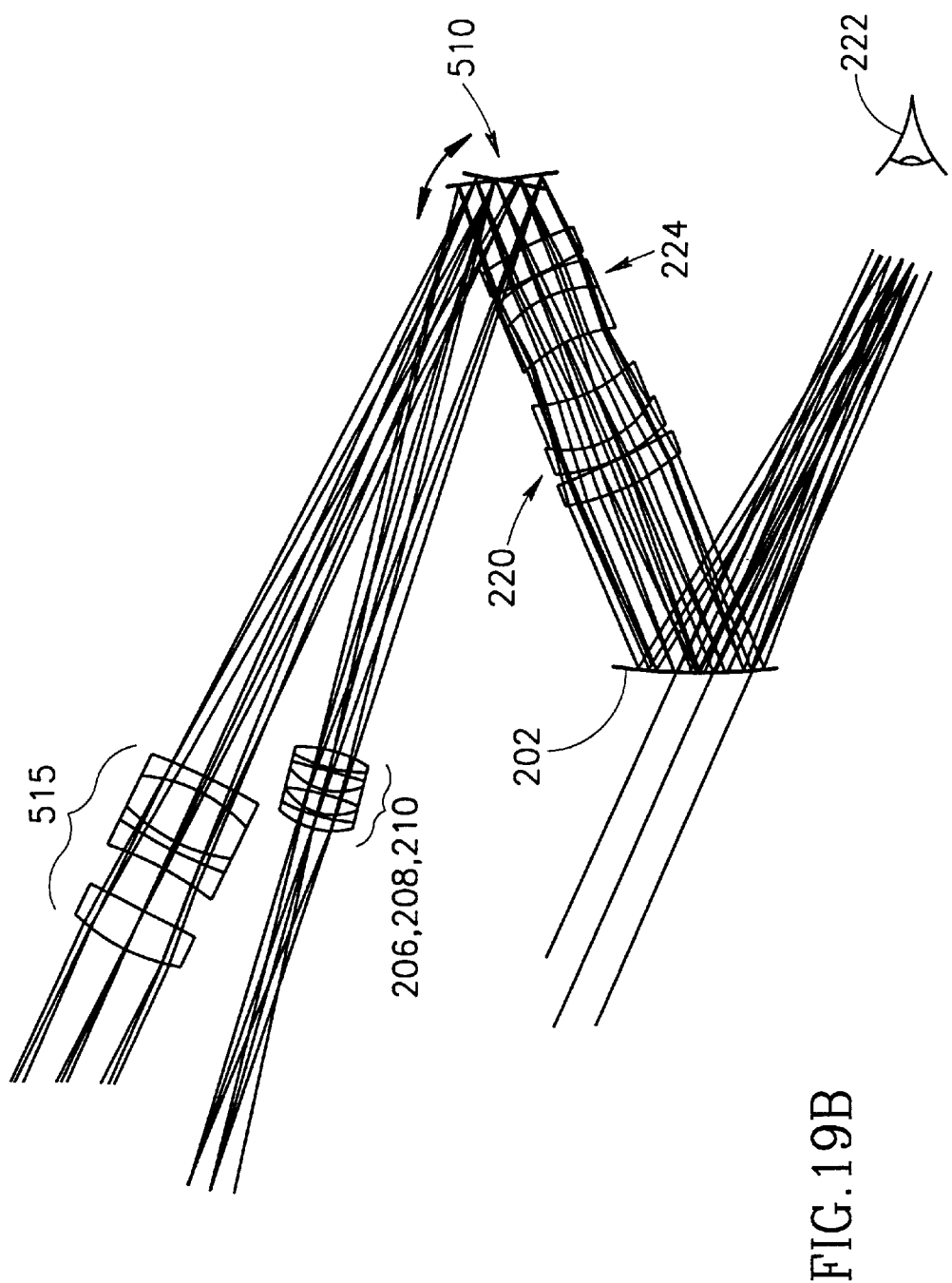
FIG. 19B is an illustration of the optical design of the optical system of FIG. 19A and the optical path of light rays therein.

Reference is now made to FIGS. 18A and 19A which illustrate optical systems 500 and 600 utilizing electronic time-shared combiners in a helmet mounted preferred embodiment, constructed and operative in accordance with further embodiments of the invention. The combiners utilized in optical systems 500 and 600 provide combining flexibility for both day and night usages. Similar elements which have similar numerals to those of optical system 200 (FIG. 10) will not be further described herein. FIGS. 18B and 19B illustrate the optical schematic of systems 500 and 600, respectively, and the optical path of light rays therein.

In preferred embodiments of the present invention, the optical systems described hereinbelow comprise a DMD, referenced 510. In an alternative preferred embodiment, optical system 500 can comprise an R-LCD.

Additionally, preferably the optical systems described hereinbelow can alternatively embody an image intensifier ($I^2$), a cathode ray tube, an image intensifier coupled with a charge coupled device (ICCD) camera, a forward looking infra red (FLIR), an AM-LCD, an AM-EL, an electronic bombard charge coupling device (EBCCD) and/or a Programmable Logic Device (PLD).

Referring now specifically to FIG. 18A, optical system 500 is utilized to create colored and monochrome symbology with a high contrast over a bright scene. Optical system 500 comprises an electronic unit 511, which controls the deflection position of DMD 510 and more specifically, the deflection position of mirrors 400 (FIG. 17A, not shown in FIG. 18) in DMD 510. Optical system 500 also comprises three highly efficient colored light sources 515 in red, blue and green.

Electronic unit 511 comprises an image processor/timing unit 512 and a display interface 513. A signal corresponding to a desired deflection position of DMD 510 is fed into unit 512, and transferred to display interface 513. The signal is then transferred to a display electronics 514 which is joined to DMD 510. Display electronics 514 sends signals to DMD 510 controlling each pixelated mirrors 400 (FIG. 17A) in DMD 510 and thus controlling which light source 515 is reflected off of pixelated mirrors 400.

The light source 515 reflected off the pixelated mirror 400 in DMD 510 is focused by optics 224 and 220, reflected off a visor 220 and eventually received by an eye 222. Simultaneously an image from outside scene 520 is transferred through visor 220, and received by eye 222. Eye 222 thus receives the pixelated image from the DMD 510 superimposed on the image received from the outside scene 520.

Colored light sources 515 may be created by colored lamps or filtered white light and must be rapidly switchable, for example, fluorescent, arc-lamp, lasers, laser diode, LED or flash lamp.

In system 500, monochrome symbology is achieved by not switching colored light sources 515 and thus giving continuous single color light. The DMD/R-LCD 510 is in the focal plane of the HMD optics so the viewer sees light reflected from the DMD/R-LCD. Each mirror 400 (FIG. 17A) on the DMD is electrically manipulated by display electronics 614 which receive the pixel information from electronic unit 511 to move angularly so as to reflect light corresponding to each pixel of an image either to the eye 222 of the pilot or elsewhere.

When light is reflected elsewhere, the viewer sees black on that particular pixel. Thus, with suitable electrical manipulation, a symbology image may be generated and superimposed on the outside scene 520.

Color symbology is achieved by rapid switching of light sources 515 sequentially to give red, blue and green primary colors for each particular frame. An ordinary white or colored light source yields a monochromic image.

Referring now briefly to FIG. 18B, an illustration of the optical design implementation of optical system 500. FIG. 18B illustrates the optical path of the light rays as they transmitted from light source 515 through system 500 to eye 222.

Reference is now made to FIG. 19A which illustrates optical system 600. Optical system 600 is configured for combining an indirect scene such as that produced by an image intensifier 206 with a symbology scene. Elements which are the same as those in optical system 200 are similarly labeled and will not be described further.

System 600 comprises electronic unit 511 and image processor/timing unit 512, display interface 513, and display electronics 514, which are joined to DMD 510. Display electronics 514 sends signals to DMD 510 for controlling the deflection of mirrors 400 (FIG. 17A) in DMD 510.

System 600 also comprises three colored light sources 515, as described hereinabove in optical system 500, in red, blue and green. DMD 510 produces a colored symbology image via the usage of light sources 515. The colored symbology image is combined with an indirect scene from the image intensifier 206. The sequence of events required to produce a combined indirect and symbology image is described below.

Image intensifier 206 projects an image of a scene 520 through lens 204. The image intensifier 206 produces an intensified image (represented by light rays 217) of the scene which travels through lens 206 to mirror 210. Mirror 210 then directs the intensified rays 217 to DMD 510. Mirror elements 400 (FIG. 17A) on DMD 510 deflect at an angle which directs the image of the scene via lenses 216 and 218, mirror 224 and lens 220 to visor 202.

Electronic unit 511 sends instruction to display electronics 514 which electrically manipulates the deflection angle of each mirror 400 (FIG. 17A) on the DMD. The image reflected off mirror 400 is then reflected from the visor 202 to the viewer, represented by eye 222. The combined images are superimposed with the direct scene ("sensor fusion") which came through the visor (520), which acts as an optical combiner.

The switched red, green and blue rays emanating from colored light sources 515 are permanently incident on mirrors 400 of DMD 510. After the intensified image 217 is displayed on visor 202, come of the mirrors 400 are then required to generate a particular symbology picture. These mirrors 400 are next deflected to an angle which directs a pixelated symbology image, represented by rays 640, via lenses 216 and 218, mirror 224 and lens 220 reflected off visor 202 and onto eye 222.

Hence, the symbology image 640 is built up by the mirrors 400 which are deflected to produce a pixel of light on visor 202, whilst the non-deflected mirrors 400 produce the intensified image 217. The duration of deflection of a mirror 400 determines the color mix and brightness of the final image as it determines the proportion of time each of the switched red, blue and green rays are incident on DMD 510. A monochrome symbology image 640 is achieved by the use of a monochromatic light source wherein colored light sources 515 are permanently on.

The length of time that a mirror 400 is deflected creates the brightness level of that particular pixel. This is true in the case of both the intensified image 217 or symbology image 640.

It should be noted that rays 640 represent the path of intensified image 217 from DMD 510 when mirrors 400 of DMD 510 are oriented to deflect intensified image 217 to visor 202. It should also be noted that the switch between the projection of intensified image 217 onto visor 202 and the projection of symbology image 640 is done in such a short time span that eye 222 does not recognize the switch.

Since each DMD in optical system 600, in effect, projects separately and deflects at full intensity from its given source—either intensified image 217 or symbology image 640—optical system 600 projects the whole intensity of both intensified image 217 and symbology image 640. This is not the case with traditional combiner technology where part of each image must be lost in the course of their combination.

In addition to the ability to project the whole intensity of each image, the intensity of each image may be varied from zero to a maximum independently of the other. This is achieved by varying the brightness of each source image intensifier 206 or light source 515 or mirrors deflection angles.

Further, pixel by pixel control of the intensity of each respective image 217 and 640 is achievable by varying the individual position of particular mirrors 400 during the respective generation of images 217 and 640. By using a reflective addressing device, the angles of each particular mirror 400, and the individual duration of deflection can be altered with each change in the scenes external brightness/ darkness.

These aspects of the invention which allow for continuous adjustment compensate for the difficulties previously encountered in switching between day and night regimes. Also, the fact that almost the whole intensity of an image depends on the mirror quality is utilized overcomes brightness inadequacies of either intensified image 217 or symbology image 640 in a darkness or light regime. Further, particular aspects of either scene may be highlighted individually by intensifying or lightening certain pixels.

Other embodiments of optical system 600 replace image intensifier 206 with any of the following, but not limited to: a CRT, an ICCD, a forward locking infra red (FLIR), an Active Matrix-LCD, an Active Matrix-Elor, an electronic bombard charge coupling device (EBCCD), and a PLD, or any type of display source.

Referring now briefly to FIG. 19B, an illustration of the optical design implementation of optical system 600. FIG. 19B illustrates the optical path of the light rays as they transmitted from light source 515 and image intensifier 206, combined and transmitted through system 600 to eye 222.

Optical systems 500 and 600 are merely examples of the use of a DMD to combine and produce images as applied to HMD's in general. Many alternative configurations of optical systems both within HMD's and without are possible.

Figure 20:
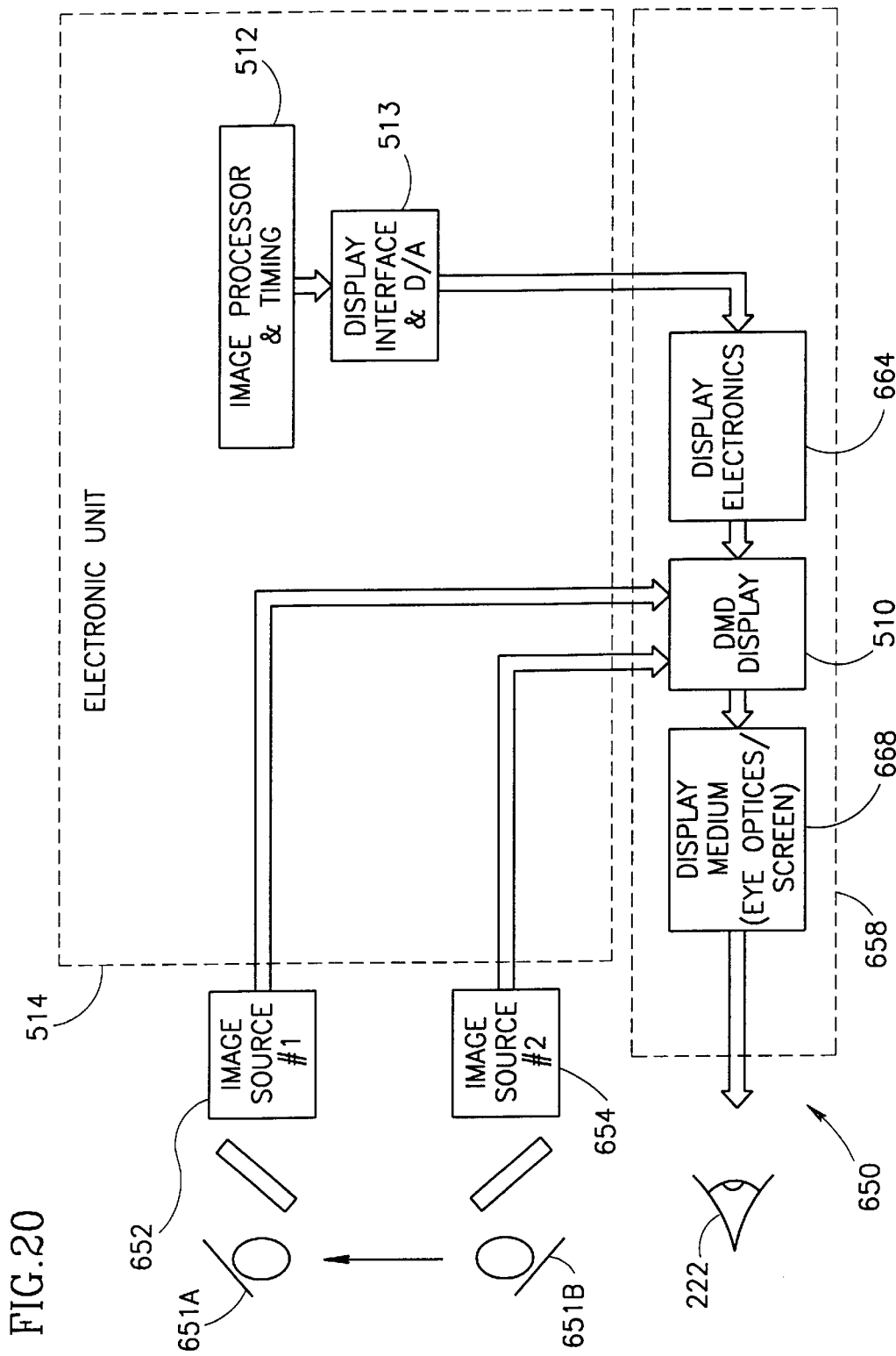
FIG. 20 is a schematic illustration of a DMD system for image fusion according to a preferred embodiment of the present invention.
Figure 21:
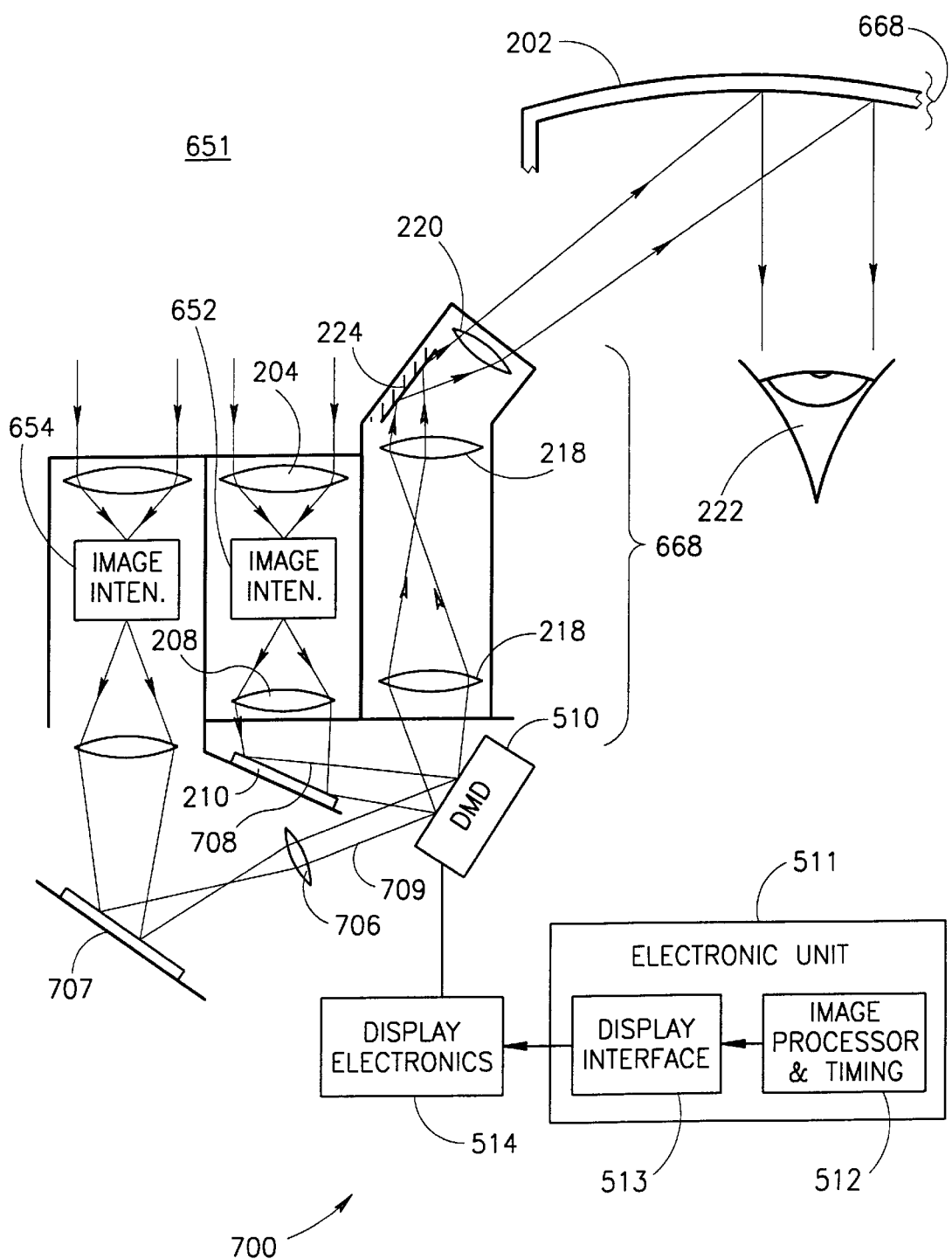
FIG. 21 is a partial schematic illustration of an optical system utilizing a DMD to provide image fusion in a HMD.
Figure 10:
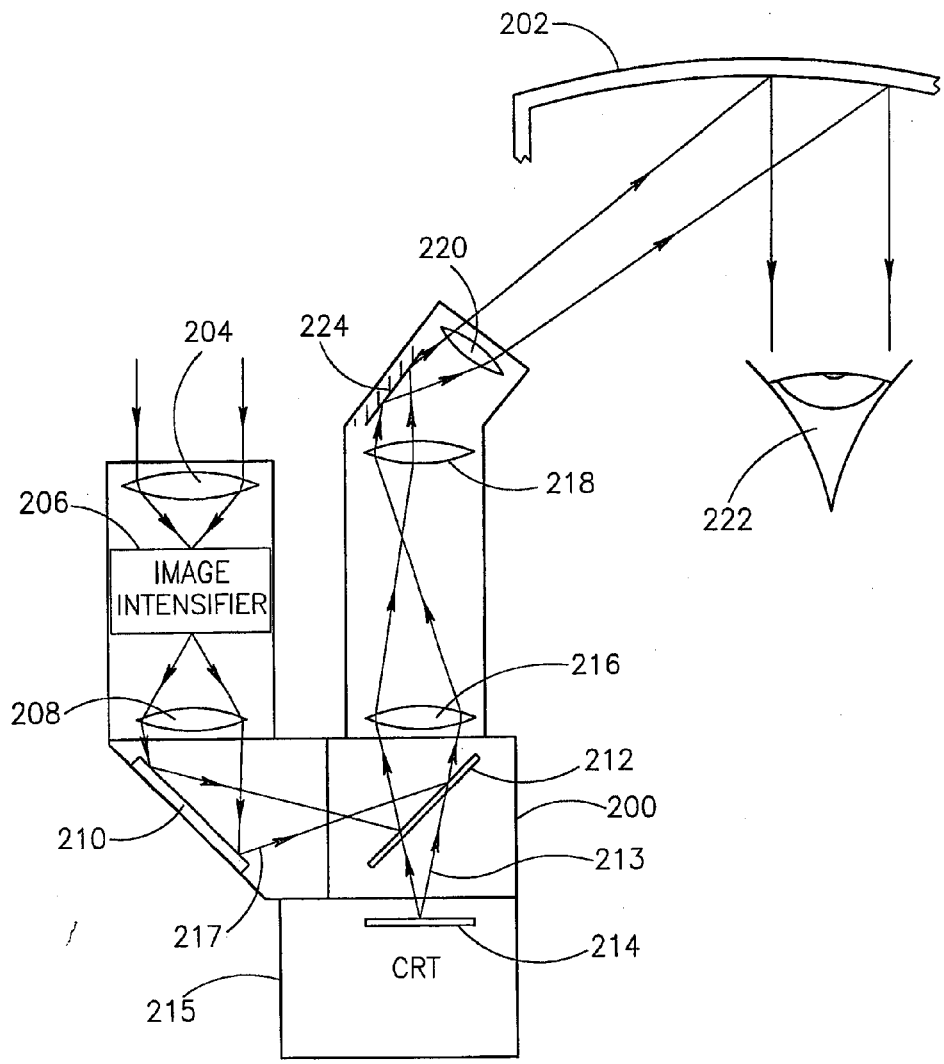
Figure 11:
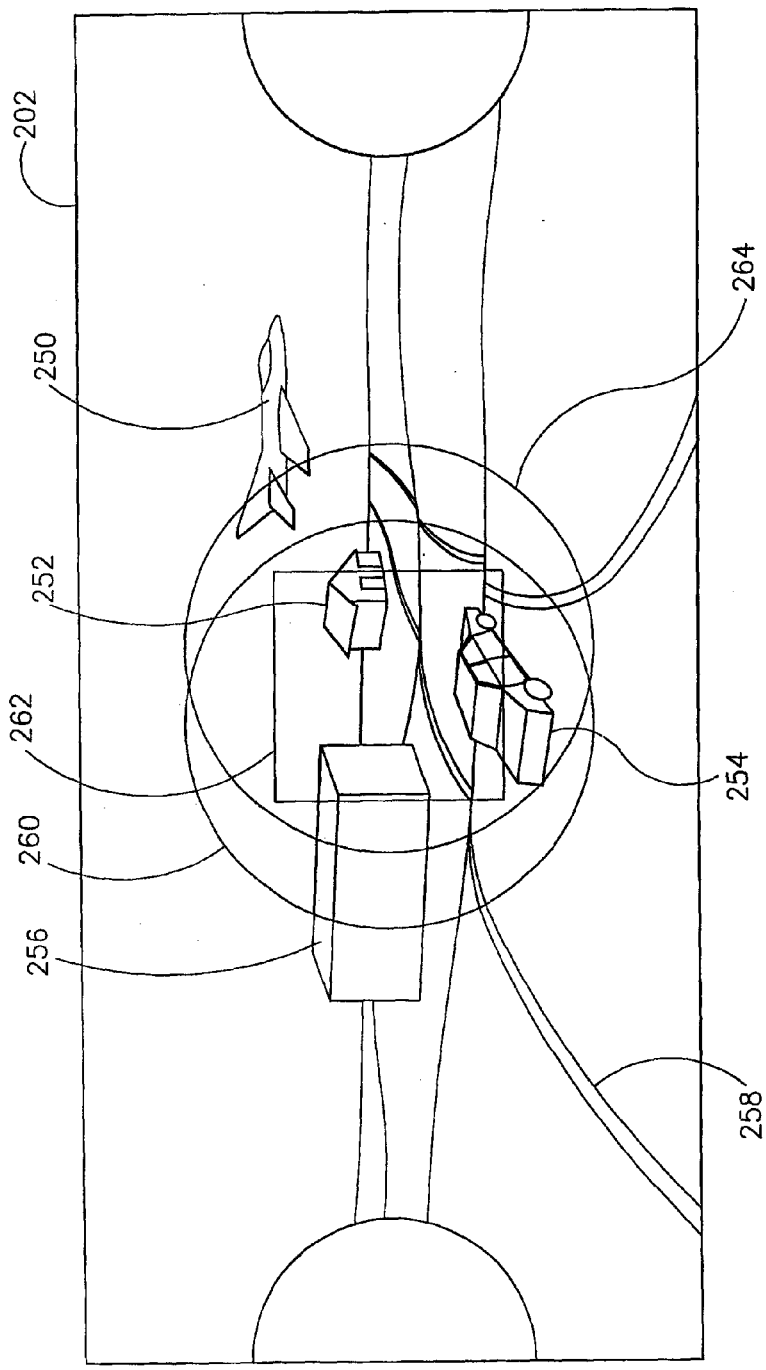

Reference is now made to FIGS. 20 and 21. FIG. 20 is a schematic illustration of a DMD system for image fusion. FIG. 21 is a partial schematic illustration of an optical system 700, utilizing a DMD to provide image fusion in a HMD or other sight application. Elements which are the same as those in previously described optical systems are similarly labeled and will not be described further.

Image fusion is the process of fusing or combining two images, either a direct and indirect or two direct images, into a single signal. Two images of the same scene may be desirable in an instance such as a foggy or smoky scene, in which case one source may be an I$^2$ and the other source may be a FLIR. For this embodiment, the process involves digital fusion of two digital signals, and projection of the signal fused image.

Reference is now made to FIG. 20. FIG. 20 shows a diagram of a system 650 used for combining two images 651A and 651B, both of which view the same scene. The two images are received by a first image source 652 and a second image source 654 and transferred to DMD 510.

System 650 additionally comprises electronic unit 511, similar to the one described in reference to FIG. 19, and a display unit 658. Display unit 658 contains display electronics 664, DMD 510 and an optical relay 668. Examples of relay 668 are eye optics or projection screen optics.

Image processor/timing unit 512 sends a signal via display interface 513 and display electronics 664 to DMD 510. Upon receiving the signal DMD 510 alters the movement of mirrors 400 (FIG. 17A), on a pixel by pixel basis, switching between receiving either image 651A or 651B. The received image, either that of 651A or 651B, is transferred to relay 668 and viewed by an observer, represented by an eye 222.

Mirrors 400 (FIG. 17A) of DMD 510 thus flip back and forth, alternating between the first image source 652 or a part of it, and the second image source 654 or a part of it. Furthermore, the intensity of individual pixels on first source 652 and second source 654 are controlled by varying the duration of deflection of mirror 400 (FIG. 17A).

It should be noted that eye 222 receives nearly 100% of both images, one after the other, in a time shared fashion. This is in contrast to the illustration and description given hereinabove in reference to FIG. 2.

Figure 2:
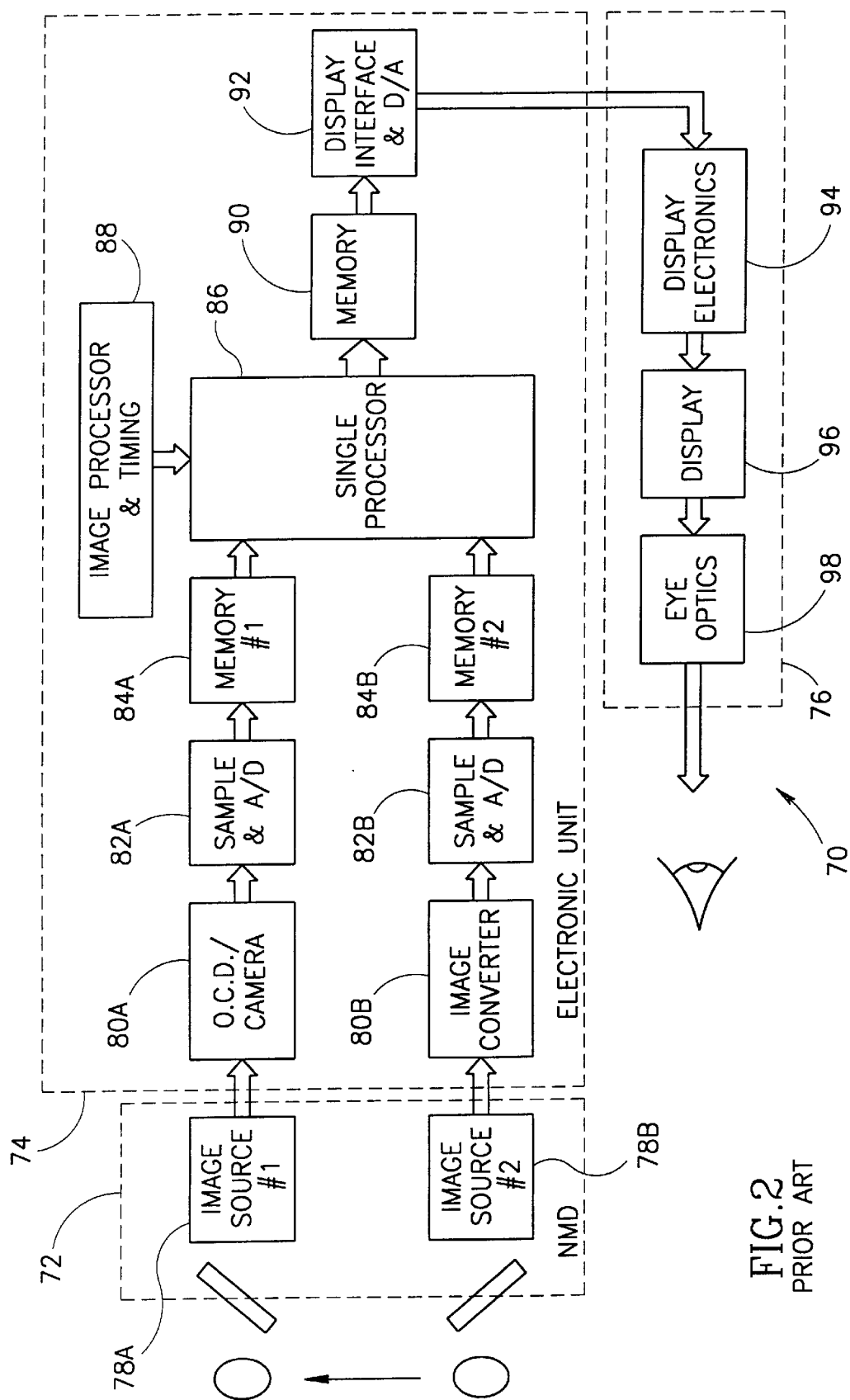
FIG. 2 is a schematic illustration of a prior art electro-optic system for combining two images to give pixel by pixel control of the ratio of intensities of the respective images.

The final image as received by the viewer in FIG. 2 was a simultaneous superimposed image of two scenes. As such, the final image was the sum of a relative percentage of each scene's reflected and transmitted rays, summed together to be equal to or less than 100%. Thus only a relative proportion of each image was received by the viewer, in the present invention 100% of each image, both image 651A and 651B, is received by the viewer.

Thus, when the first image source 652 is reflected by DMD 400, the second image source is black and conversely, when the second image source is reflected by DMD 400, the first image source is black. Switching between the images occurs at such a fast rate that eye 222 does not register the switching and therefore, the first image source 652 appears to be superimposed on the second image source 654. This superposition may be termed a "sensor fusion".

First and second image sources 652 and 654, respectively, may both be direct scene images or indirect images such as those generated by I$^2$, FLIR, EBCCD and CCD or they may be mixed, for example image source 652 may be an indirect image and image source 654 may be a direct scene image. The image processor 512 algorithm determines the image fusion degree per pixel. Relay 668 may be either eye optics or a video or TV screen or any other suitable medium.

Reference is now made to FIG. 21 which shows an alternative embodiment 700 of DMD system 650. Elements which are similar to those described in optical system 200 are similarly labeled and will not be further described. Similarly, parts equivalent to those described in system 650 are similarly labeled and will not be further described. FIG. 21 illustrates image fusion utilizing a DMD in a HMD embodiment.

An image of scene 651 is converged by lens 204 and received by a first image source 652. Source 652, which is depicted in FIG. 21 as an I$^2$ for exemplary purposes only, may be any direct scene image units such as I$^2$, FLIR and CCD or other suitable medium. The image received by source 652 is further converged by lens 208 and mirror 210, producing rays 708.

Similarly, the scene 651 is converged and received by a second image source 654. The image is further reflected from mirror 707 and converged by lens 706, producing rays 709.

Rays 708 and 709 are both received by DMD 510, and more specifically mirrors 400 (FIG. 17A) which reside within DMD 510. Mirrors 400 of DMD 510 flip back and forth between rays 708 to rays 709. The image deflected off mirrors 400 of DMD 510 are focused by optics 216, 218 and 200, reflected off visor 202, and received by eye 222.

The fast switch deflections of mirrors 400 are automatically timed to appear to eye 222 that ray 708 is superimposed onto ray 709, or visa versa. The timing and processing of this maneuver is achieved by an image processor/timing device 512 coupled to a display interface 513 which is coupled to a display electronics 664.

Thus, image 708 and 706 appear superimposed to the eye and source fusion of first image source 652 and second image source 654 is achieved. Each individual mirror 400 (FIG. 17A) of DMD 510 can be programmed with the desired deflection duration, thus controlling which pixels of images 708 and 709 are displayed and their respective intensities.

It will be appreciated by a person skilled in the arts that the superimposed image in addition to being viewed by eye 222, can be displayed on a suitable recording/displaying device. Electronic unit 511 can be coupled to a digital processor (not shown) which transfers the digital superimposed image to a digital recorder, TV screen, or other viewing medium.

It will be appreciated that the present invention is not limited by the preferred embodiments described hereinabove and that many modifications, all of which are within the scope of the present invention exist. For example, the recording unit 320 (FIG. 15) can operate during daylight flight without image intensifier 326. Another example is to replace the unit 320 with a different light source and the like. By way of further example, the methods utilized in optical systems 500, 600, and 700 for creating symbology over a bright scene and for combining an indirect scene with a symbology scene may be utilized in non-HMD applications.

It will be appreciated by persons skilled in the art that the present invention is not limited by what has been particularly shown and described herein above. Further the scope of the invention is defined by the claims which follow:

What is claimed is:

1. A system for displaying high contrast images over a scene on a helmet mounted display comprising:
    a source of light;
    a digital reflective device or a reflective addressing device containing a plurality of micromirrors for deflecting said source of light in a pixelated manner via a plurality of pixels, wherein each pixel corresponds to a deflection of each micromirror on said digital reflective device and wherein the intensity of each pixel is proportional to the duration of said deflection; and
    means for controllably deflecting said micromirror as a function of time.

2. A system according to claim 1, wherein said digital reflective device comprises a digital micromirror display.

3. A system according to claim 1, wherein said digital reflective device comprises a reflective active matrix-liquid crystal display.

4. A system according to claim 1, wherein said source of light is a switched red, green and blue array for producing color images.

5. A system according to claim 1, wherein said source of light is a switched colored array for producing monochromatic images.

6. A system according to claim 1 wherein said means for controllably deflecting said digital reflective device comprises an image processor and timing circuit.

7. A system for displaying high contrast images over a scene generated by an optical system in a helmet mounted display comprising:
    a source of light;
    at least one display optical system for producing an optical image;
    means for switchably deflecting between said source of light and said optical system as a function of time for creating a high contrast image from said source of light; and
    means for superposing said source of light over said optical image.

8. A system according to claim 7 wherein said means for superposing comprises means for adjusting superposition intensity for said high contrast image and for said optical image in a continuously variable pixelated manner.

9. A system according to claim 7 wherein said means for deflecting is a digital micromirror display.

10. A system according to claim 7 wherein said means for controlling comprises an image processor and timing circuit.

11. A system according to claim 7, wherein said at least one display optical system is a reflective device which generates images.

12. A system according to claim 7, wherein said at least one display optical system is a emissive device which generates images.

13. A system for displaying two or more images comprising:
    at least one first image source for producing at least one first image;
    at least one second image source for producing at least one second image;
    means for switchably deflecting between said at least one first image source and said at least one second image source as a function of time and superposing said at least one first image and said at least one second image to form an observably single image, wherein said superposition intensity for each of said at least one first image and said at least one second image.

14. A system according to claim 13 and wherein said superposition intensity is continuously variable in a pixelated manner.

15. A system according to claim 13 wherein said means for deflecting is a digital micromirror display.

16. A system according to claim 13 wherein said means for deflecting is a digital reflective device.

17. A system according to claim 13 wherein said means for deflecting is a reflective addressing device.

18. A system according to claim 13 and comprising means for controlling said means for switchably deflecting between said at least one first image and said at least one second image.

19. A system according to claim 18 wherein said means for controlling comprises an image processor and timing circuit.

20. A system according to claim 18 and comprising means for sensing said single image.

21. A system according to claim 20 wherein said means for sensing comprises means for displaying.

22. A system according to claim 20, wherein said means for sensing is a display.

23. A system according to claim 13, wherein said at least one image source is a reflective device which generates images.

24. A system according to claim 13, wherein said at least one image source is a emissive device which generates images.

25. A system according to claim 13, wherein said image source is a direct image source.

26. A method for combining two images comprising the steps of:

creating a first image;

creating a second image;

switchably alternating between said first image and said second image to create a viewable combined single image, wherein said switching is timed on a pixel by pixel basis to vary the intensity of each of said first and said second image on a pixel by pixel basis.

* * * * *

UNITED STATES PATENT AND TRADEMARK OFFICE
CERTIFICATE OF CORRECTION

PATENT NO.     : 6,195,206 B1
DATED          : February 27, 2001
INVENTOR(S)    : Yona, Zvi et al.

It is certified that error appears in the above-identified patent and that said Letters Patent is hereby corrected as shown below:

Delete Title page and replace with the attached Title page.

Drawings,
Please replace figures 10, 11, 15, 20 and 21 with the attached corresponding figures.

United States Patent
Yona et al.

(10) Patent No.: US 6,195,206 B1
(45) Date of Patent: Feb. 27, 2001

(54) OPTICAL SYSTEM FOR DAY AND NIGHT USE

(75) Inventors: Zvi Yona, Karkur; Sasson Abraham; Joseph Yaeli, both of Haifa, all of (IL)

(73) Assignee: Elbit Systems Ltd., Haifa (IL)

(*) Notice: Subject to any disclaimer, the term of this patent is extended or adjusted under 35 U.S.C. 154(b) by 0 days.

(21) Appl. No.: 09/228,418

(22) Filed: Jan. 12, 1999

(30) Foreign Application Priority Data

Jan. 13, 1998 (IL) ........................................... 122929
Oct. 22, 1998 (IL) ........................................... 126726

(51) Int. Cl.[7] .............................. G02B 27/14; G02B 27/12
(52) U.S. Cl. ............................................. 359/630; 359/639
(58) Field of Search ..................................... 359/630, 633, 359/636, 638, 639; 345/7, 8, 9

(56) References Cited

U.S. PATENT DOCUMENTS

| | | | |
|---|---|---|---|
| 4,660,943 | 4/1987 | Ellis | 359/362 |
| 4,689,834 | 9/1987 | McCarthy et al. | 2/6.2 |
| 4,775,217 | 10/1988 | Ellis | 313/524 |
| 4,902,116 | 2/1990 | Ellis | 359/480 |
| 4,961,626 | 10/1990 | Fournier, Jr. et al. | |
| 5,035,474 | 7/1991 | Moss et al. | 359/13 |
| 5,091,719 | 2/1992 | Beamon, III | 348/8 |
| 5,113,177 | 5/1992 | Cohen | 345/8 |
| 5,184,231 | 2/1993 | Ellis | 359/13 |
| 5,243,450 | 9/1993 | Gerbe et al. | 359/13 |
| 5,266,930 | 11/1993 | Ichikawa et al. | 345/8 |
| 5,398,309 * | 3/1995 | Atkins et al. | 395/135 |
| 5,416,315 | 5/1995 | Filipovich | 250/214 VT |

FOREIGN PATENT DOCUMENTS

| | | |
|---|---|---|
| 0206324 A2 | 12/1986 | (EP) . |
| 0301473 B1 | 2/1989 | (EP) . |
| 0459580 B1 | 12/1991 | (EP) . |
| 0475790 A1 | 3/1992 | (EP) . |
| 0579506 A1 | 1/1994 | (EP) . |
| 0599759 A1 | 6/1994 | (EP) . |
| 0603027 A1 | 6/1994 | (EP) . |
| 0603092 A1 | 6/1994 | (EP) . |
| 0628261 A1 | 12/1994 | (EP) . |
| 0635742 A2 | 1/1995 | (EP) . |
| 0657111 A1 | 6/1995 | (EP) . |
| 0671646 | 9/1995 | (EP) . |
| 0284389 B1 | 9/1998 | (EP) . |
| WO 94/11773 | 5/1994 | (WO) . |
| WO 94/14349 | 7/1994 | (WO) . |

OTHER PUBLICATIONS

"An Overview of the Performance Envelope of Digital Micromirror Device (DMD) Based Projection Display Systems" Dr. Jeffrey B. Sampsell Digital Imaging Preprint from: Society for Information Display 1994 International Symposium, Seminar, Exhibition San Jose, California Jun. 12–17, 1994, pp. 1–4.

"DMD Display Systems: The Impact of an All-Digital Display ",Robert J. Gove Preprint form: Society for Information Display 1994 International Symposium, Seminar, Exhibition San Jose, California Jun. 12–17, 1994.

* cited by examiner

*Primary Examiner*—Ricky Mack
(74) *Attorney, Agent, or Firm*—Pillsbury Madison & Sutro LLP

(57) ABSTRACT

A helmet mounted display for mounting on a helmet includes a supporting structure removably mounted at at least one point to the helmet, a visor, mounted on the structure, and at least one optical system, for projecting an image on the visor from the side of the pilot's head. The at least one optical system is side mounted on the supporting structure, and includes a source of light and a digital reflective device or a reflective addressing device. The digital reflective device contains a plurality of micromirrors for deflecting the light source in a pixelated manner via a plurality of pixels. The deflection of the micromirror can be controlled as a function of time.

26 Claims, 24 Drawing Sheets

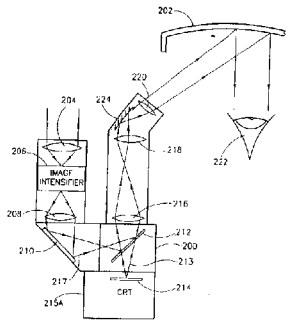

UNITED STATES PATENT AND TRADEMARK OFFICE
CERTIFICATE OF CORRECTION

PATENT NO. : 6,195,206 B1
DATED : February 27, 2001
INVENTOR(S) : Yona, Zvi et al.

It is certified that error appears in the above-identified patent and that said Letters Patent is hereby corrected as shown below:

Column 2,
Line 60, please replace "by combiner" with -- by the combiner --.
Line 61, please replace "image are equal" with -- image and are equal --.
Line 62, please replace "sum of two rays" with -- sum of the two rays --.

Column 3,
Line 10, please replace "sources which are looking at a same" with -- sources looking at the same --.
Line 22, please replace "to herein shows" with -- to, shows --.
Line 35, please replace "image, any other desirable combination, or image sources." with -- image; however, any other combination of image sources may be used --.
Line 55, please replace "Color" with -- Crystal --.
Line 59, please replace "unit 74" with -- unit 70 --.

Column 4,
Line 28, please delete "or visor".
Line 55, please replace "used, according" with -- used according --.

Column 5,
Line 35, please replace "active matrix-liquid crystal display. And" with -- active-matrix liquid crystal display, and --.
Line 47, please replace "images, or a emissive" with -- images or an emissive --.
Line 50, please replace "The at least first image is produce by at least one first image source and the at least one second image is produced by a at least one second image source." with -- A first image is produced by at least a first image source and a second image is produced by at least a second image. --.

Column 6,
Line 48, please replace "of circuit for controlling the operation a prior art power circuit for providing power to" with -- of a prior art power circuit for controlling the operation of --.
Line 59, please replace "schematic illustration in detail" with -- schematic, side view, cross-sectional illustration --.

UNITED STATES PATENT AND TRADEMARK OFFICE
CERTIFICATE OF CORRECTION

PATENT NO.    : 6,195,206 B1
DATED         : February 27, 2001
INVENTOR(S)   : Yona, Zvi et al.

It is certified that error appears in the above-identified patent and that said Letters Patent is hereby corrected as shown below:

Column 7,
Lines 22 and 27, please replace "isometrix" with -- isometric --.
Line 44, please replace "anthropometrix" with -- anthropometric --.
Line 60, please replace "since, the" with -- since the --.

Column 8,
Line 21, please replace "except of with -- except for --.
Line 36, please replace "29, of the helmet," with -- 29 of the helmet --.
Line 40, please replace "mounted" with -- mounts --.
Line 49, please replace "isometrix" with -- isometric --.
Line 54, please replace "display 52 which includes a visor 54, an arc 62 an optical system 56, attached on the left side of the visor 54 and an optical system 57, attached on the right side of the visor 54." with -- display 52, which includes a visor 54, an arc 62, an optical system 56 attached on the left side of the visor, and an optical system 57 attached on the right side of the visor. --.

Column 9,
Line 9, please replace "(CRT) wherein" with -- (CRT), wherein --.
Line 31, please delete "either".
Line 34, please replace "extremely" with -- very --.
Line 49, please replace "and image" with -- an image --.

Column 10,
Line 13, please replace "images" with -- image --.
Line 38, please replace "221" with -- 219 --.
Line 63, please delete "the operation".

Column 11,
Line 7, please replace "306" with -- 300 --.
Line 10, please replace "Circuit 306" with -- Circuit 300 -- and "Tube 300" with -- Tube 306 --.
Line 39, please replace "and image" with -- an image --.
Line 43, please replace "Mirror 328" with -- Mirror 330 --.
Line 57, please replace "Pilot," with -- A pilot, --.

UNITED STATES PATENT AND TRADEMARK OFFICE
CERTIFICATE OF CORRECTION

PATENT NO.    : 6,195,206 B1
DATED         : February 27, 2001
INVENTOR(S)   : Yona, Zvi et al.

It is certified that error appears in the above-identified patent and that said Letters Patent is hereby corrected as shown below:

Column 12,
Line 30, please replace "facilitate" with -- facilitates --.
Line 37, please replace "focusing" with -- focused --.
Line 39, please replace "converts" with -- convert --.
Line 53, please delete "switching".

Column 13,
Line 17, please replace "515 in" with -- 515, in --.
Line 28, please delete "of".
Lines 31 and 33, please replace "visor 220" with -- visor 202 --.
Line 60, after "system 500" please add -- is shown --.
Line 62, please replace "transmitted" with -- are transmitted --.

Column 14,
Line 21, please replace "deflect" with -- are deflected --.
Line 25, please replace "instruction" with -- instructions --.

Column 15,
Line 15, please replace "scenes" with -- scene's --.
Line 34, after "600" please add -- is shown --.
Line 35, after "they" please add -- are --.
Line 62, please replace "654 and" with -- 654, respectively, and --.

Column 16,
Line 3, please replace "signal" with -- signal, --.
Line 15, please replace "time shared" with -- time-shared --.
Line 17, please replace "FIG. 2" with -- the prior art system of Fig. 2 --.
Line 18, please replace "FIG. 2 was" with -- the prior art system of Fig. 2 is --.
Line 20, please replace "image was" with -- image in the system of Fig. 2 is --.
Line 23, please replace "was received by the viewer, in the present" with -- is received by the viewer of the system in Fig. 2. In the present --.
Line 32, please replace "and therefore," with -- and, therefore, --.
Line 36, please replace "images" with -- images, --.
Line 37, please replace "CCD" with -- CCD, --.

UNITED STATES PATENT AND TRADEMARK OFFICE
CERTIFICATE OF CORRECTION

PATENT NO. : 6,195,206 B1
DATED : February 27, 2001
INVENTOR(S) : Yona, Zvi et al.

It is certified that error appears in the above-identified patent and that said Letters Patent is hereby corrected as shown below:

Column 16, cont'd,
Line 38, please replace "example" with -- example, --.
Line 42, please replace "screen" with -- screen, --.
Line 54, please replace "units" with -- unit, --.
Line 55, please replace "CCD" with -- CCD, --.
Line 67, please replace "200" with -- 220 --.

Column 17,
Line 3, please replace "visa versa." with -- vice versa. --.
Line 7, please replace "706" with -- 709 --.

Column 18,
Line 27, please replace "a emissive" with -- an emissive --.
Line 42, please replace "superposition intensity for each" with -- superposition intensity is variable for each --.

Column 19,
Line 5, please replace "a emissive" with -- an emissive --.

Signed and Sealed this

Twenty-eighth Day of October, 2003

JAMES E. ROGAN
*Director of the United States Patent and Trademark Office*